US008782086B2

(12) United States Patent
Resch

(10) Patent No.: US 8,782,086 B2
(45) Date of Patent: *Jul. 15, 2014

(54) UPDATING DISPERSED STORAGE NETWORK ACCESS CONTROL INFORMATION

(75) Inventor: Jason K. Resch, Chicago, IL (US)

(73) Assignee: Cleversafe, Inc., Chicago, IL (US)

(*) Notice: Subject to any disclaimer, the term of this patent is extended or adjusted under 35 U.S.C. 154(b) by 36 days.

This patent is subject to a terminal disclaimer.

(21) Appl. No.: 12/759,703

(22) Filed: Apr. 14, 2010

(65) Prior Publication Data

US 2011/0055277 A1    Mar. 3, 2011

Related U.S. Application Data

(60) Provisional application No. 61/237,645, filed on Aug. 27, 2009.

(51) Int. Cl.
*G06F 17/30* (2006.01)
*G06F 15/16* (2006.01)
*G06F 13/00* (2006.01)

(52) U.S. Cl.
CPC ............. *G06F 17/30* (2013.01); *G06F 15/16* (2013.01); *G06F 13/00* (2013.01)
USPC .......... 707/785; 707/783; 707/787; 709/203; 709/206; 711/162; 711/163

(58) Field of Classification Search
CPC .......... G06F 17/30; G06F 15/16; G06F 13/00
USPC ......... 707/802–805, 813, 821–829, 783–787; 714/1–3, 4.1–4.21, 6.22, 6.24, 819; 711/114, 154, 162–163; 709/203–206, 709/220–224

See application file for complete search history.

(56) References Cited

U.S. PATENT DOCUMENTS

| 4,092,732 | A |   | 5/1978  | Ouchi           |       |
|-----------|---|---|---------|-----------------|-------|
| 5,454,101 | A |   | 9/1995  | Mackay et al.   |       |
| 5,485,474 | A |   | 1/1996  | Rabin           |       |
| 5,675,782 | A | * | 10/1997 | Montague et al. | 726/4 |

(Continued)

OTHER PUBLICATIONS

R.Angelino et al. "Dispersed Generation and Storage Systems for Providing Ancillary Services in Distribution Systems",International Symposium on Power Electronics,Electrical Drives, Automation and Motion, 2010 ,pp. 343-351.*

(Continued)

*Primary Examiner* — Srirama Channavajjala
(74) *Attorney, Agent, or Firm* — Garlick & Markison; Timothy W. Markison

(57) ABSTRACT

In a dispersed storage network where slices of secure user data are stored on geographically separated storage units, a managing unit connected to the network may seek to broadcast and update secure access control list information across the network. Upon a target device receiving the broadcast the target device creates and sends an access control list change notification message to all other system devices that should have received the same broadcast if the broadcast is a valid request to update access control list information. The target device waits for responses from the other system devices to validate that the broadcast has been properly sent to a threshold number of other system devices before taking action to operationally change local data in accordance with the broadcast.

13 Claims, 12 Drawing Sheets

(56) References Cited

U.S. PATENT DOCUMENTS

| | | | |
|---|---|---|---|
| 5,774,643 | A | 6/1998 | Lubbers et al. |
| 5,802,364 | A | 9/1998 | Senator et al. |
| 5,809,285 | A | 9/1998 | Hilland |
| 5,825,877 | A * | 10/1998 | Dan et al. .................... 705/54 |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,842,523 | B1 * | 1/2005 | Niwa et al. .................... 380/286 |
| 6,879,596 | B1 | 4/2005 | Dooply |
| 6,978,366 | B1 * | 12/2005 | Ignatchenko et al. ........ 713/166 |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,281,098 | B2 * | 10/2007 | Hiraiwa et al. ............... 711/156 |
| 7,792,300 | B1 * | 9/2010 | Caronni ......................... 380/277 |
| 2002/0062422 | A1 | 5/2002 | Butterworth et al. |
| 2002/0162076 | A1 * | 10/2002 | Talagala et al. ............... 714/819 |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0149848 | A1 * | 8/2003 | Ibrahim et al. ................ 711/154 |
| 2003/0156718 | A1 * | 8/2003 | Candelore et al. ............ 380/211 |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0044162 | A1 * | 2/2005 | Liang et al. .................... 709/212 |
| 2005/0055573 | A1 | 3/2005 | Smith |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0053299 | A1 * | 3/2006 | Tomita .......................... 713/182 |
| 2006/0069719 | A1 * | 3/2006 | McCanne et al. ............. 709/203 |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0174674 | A1 * | 7/2007 | Kanayama ........................ 714/6 |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2008/0086612 | A1 * | 4/2008 | Murayama et al. ........... 711/163 |
| 2008/0133914 | A1 | 6/2008 | Isaacson et al. |
| 2008/0183975 | A1 * | 7/2008 | Foster et al. .................. 711/153 |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |

OTHER PUBLICATIONS

Lessons from Cloud computing for end-to-end security, white paper, Rev 206, ver 1.0, Jul. 8, 2009, pp. 1-20.*

International Search Report and Written Opinion; International Application No. PCT/US10/46441; mailed Oct. 8, 2010; 8 pages.

Hejtmanek, et al.; Secure Logistical Networking in Virtual Organizations; Published in CESNET technical report No. 2/2007; pp. 1-16, 2007.

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

* cited by examiner

UPDATING DISPERSED STORAGE NETWORK ACCESS CONTROL INFORMATION

CROSS REFERENCE TO RELATED PATENTS

The present U.S. Utility Patent Application claims priority pursuant to 35 U.S.C. §119(e) to U.S. Provisional Application Ser. No. 61/237,645, entitled "Authenticating Use of a Dispersed Storage Network," filed Aug. 27, 2009, pending, which is hereby incorporated herein by reference in its entirety and made part of the present U.S. Utility Patent Application for all purposes:

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing and more particularly to storage of information.

2. Description of Related Art

Computing systems are known to communicate, process, and store data. Such computing systems range from wireless smart phones to data centers that support millions of web searches, stock trades, or on-line purchases every day. Compute processing is also known to manipulate data from one form into another. For instance, raw picture data from an image sensor may be compressed, or manipulated, in accordance with a picture compression standard to produce a standardized compressed picture that can be saved or shared with others. Computer processing capability continues to advance as processing speed advances and as software applications that perform the manipulation become more sophisticated.

With the advances in computing processing speed and communication speed, computers manipulate real time media from voice to streaming high definition video. Purpose-built communications devices, like the phone, are being replaced by more general-purpose information appliances that converge many features, uses, and/or functions. For example, smart phones can support telephony communications but they are also capable of text messaging, and accessing the internet to perform functions including email, web browsing, remote applications access, and media functions. Media functions include processing telephony voice, image transfer, music files, video files, real time video streaming and more.

Each type of computing system is constructed, and hence operates, in accordance with one or more communication, processing, and storage standards. With such standards, and with advances in technology, more and more of the global information content is being converted into electronic formats. For example, more digital cameras are now being sold than film cameras, thus producing more digital picture content. High growth rates exist for web based programming that until recently was all broadcast by just a few over-the-air television stations and cable television providers. Digital content standards, such as those used in pictures, papers, books, video entertainment, and home video, all enable this global transformation of information to a digital format. Electronic content pervasiveness is producing increasing demands on the storage function of computing systems.

A typical computer storage function includes one or more memory devices to match the needs of the various operational aspects of the processing and communication functions. For example, a memory device may include solid-state NAND flash, random access memory (RAM), read only memory (ROM), or a mechanical hard disk drive. Each type of memory device has a particular performance range and normalized cost. The computing system architecture optimizes the use of one or more types of memory devices to achieve the desired functional and performance goals of the computing system. Generally, the immediacy of access dictates what type of memory device is used. For example, RAM memory locations can be accessed in any random order with a constant response time. By contrast, memory device technologies that require physical movement such as magnetic discs, tapes, and optical discs, have a variable responses time by location as the physical movement to position to a specific location can take longer than the data transfer itself.

Each type of computer storage system is constructed, and hence operates, in accordance with one or more storage standards. For instance, computer storage systems may operate in accordance with one or more standards including, but not limited to network file system (NFS), flash file system (FFS), disk file system (DFS), small computer system interface (SCSI), internet small computer system interface (iSCSI), file transfer protocol (FTP), and web-based distributed authoring and versioning (WebDAV). An operating systems (OS) and storage standard may specify the data storage format and interface between the processing subsystem and the memory devices. The interface may specify a data structure such as directories and files. Typically, a memory controller provides the interface function between the processing units/function and memory devices/storage. As new storage systems are developed, the memory controller functional requirements may change to adapt to new standards.

Memory devices may fail, especially those that utilize technologies that require physical movement like a disc drive. For example, it is not uncommon for a disc drive to suffer from bit level corruption on a regular basis, or complete drive failure after an average of three years of use. One common solution is to utilize more costly disc drives that have higher quality internal components. Another solution is to utilize multiple levels of redundant disc drives to abate these issues by replicating the data into two or more copies. One such redundant drive approach is called redundant array of independent discs (RAID). Multiple physical discs in a single enclosure or box comprise an array where parity data is added to the original data before storing the data across the array. The parity is calculated such that the failure of one or more discs will not result in the loss of the original data. The original data can be reconstructed from the other functioning discs. RAID 5 uses three or more discs to protect data from the failure of any one disc. The parity and redundancy overhead needed to fully recover data in the event of a single disc failure reduces the capacity of what the three independent discs can store by one third (n−1=3−2=2 discs of capacity using 3 discs). RAID 6 can recover from a loss of two discs and requires a minimum of four discs with an efficiency of n−2. Typical RAID systems utilize a RAID control to encode and decode the data across the array.

Drawbacks of the RAID approach include effectiveness, efficiency, and security. As more discs are added, the probability of one or two discs failing rises and is not negligible, especially if less-costly discs are used. When one disc fails, it should be immediately replaced and the data reconstructed before a second drive fails. To provide high reliability over a long time period, and if the RAID array is part of a national level computing system with occasional site outages, it is also common to minor RAID arrays at different physical locations creating fully redundant copies of the same data at several different sites. Unauthorized file access becomes a more acute problem when whole copies of the same file are replicated, either on just one storage system site or at two or more sites. In terms of cost and effectiveness, the efficiency of dedicating 1 to 2 discs per array for the RAID overhead in order to recover data in the event of a disc failure is an issue.

Therefore, a need exists to provide a data storage solution that provides more effective timeless continuity of data, minimizes adverse affects of multiple memory elements failures, provides improved security, can be adapted to a wide variety of storage system standards and/or is compatible with commercial computing and communications systems.

BRIEF DESCRIPTION OF THE SEVERAL VIEWS OF THE DRAWING(S)

DETAILED DESCRIPTION OF THE INVENTION

Figure 1:
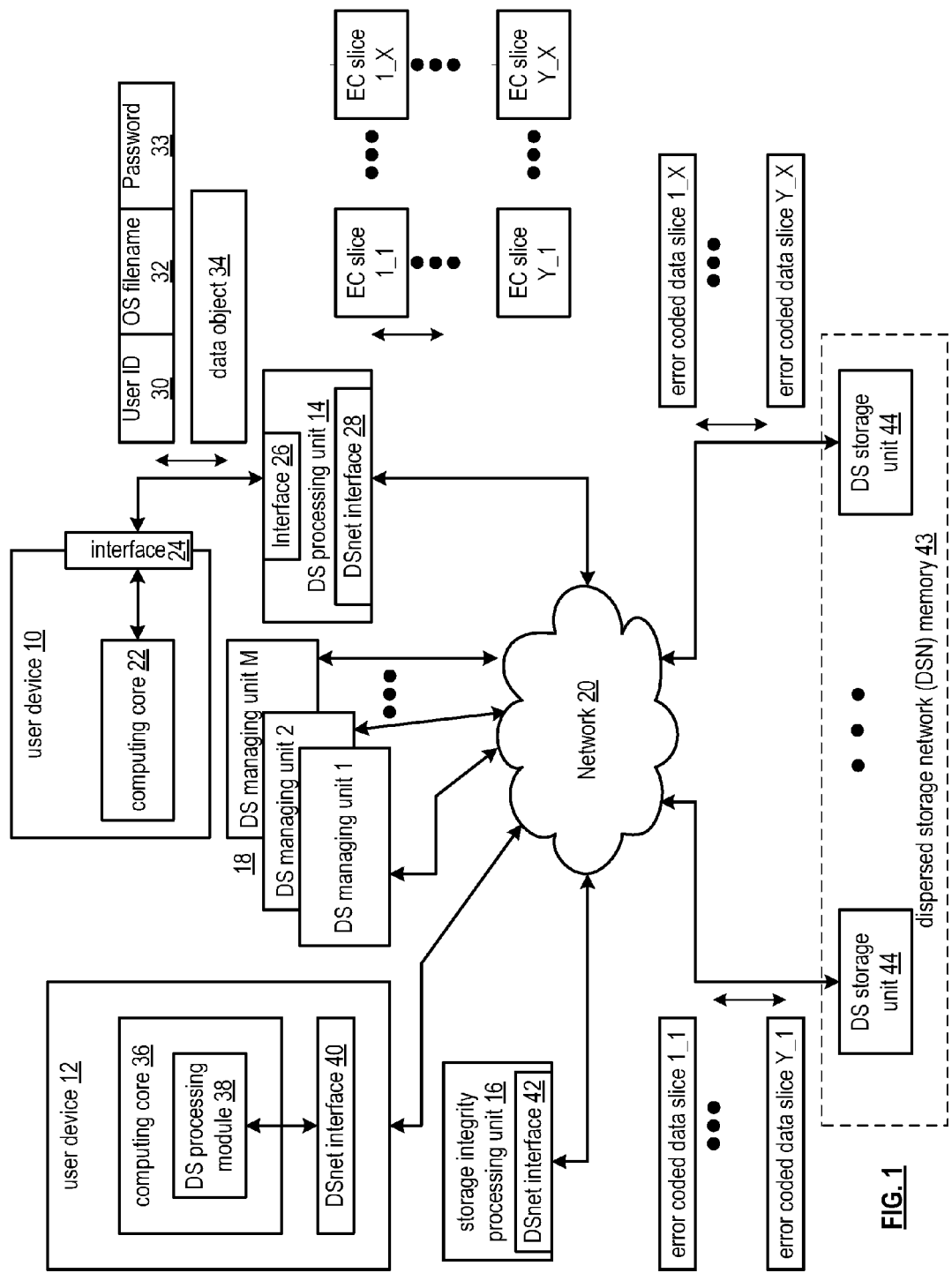
FIG. 1 is a schematic block diagram of an embodiment of a computing system in accordance with the invention.

FIG. 1 is a schematic block diagram of an embodiment of a computing system that includes a first user device 10, a dispersed storage (DS) processing unit 14, a dispersed storage network (DSN) memory 43 containing one or more DS storage units 44, a storage integrity processing unit 16, a second user device 12, a plurality of M DS managing units 18, and a network 20 providing connectivity between the devices and units of FIG. 1. The DSN memory includes a plurality of dispersed storage (DS) storage units 44 connected to the network 20. The DSN memory layer 43 at the bottom of FIG. 1 may contain a subset of the total set of DS storage units or may contain all the DS storage units in a smaller system implementation. In an example of operation, data from the user devices 10 or 16 (or some other user device) is stored to and/or retrieved from the DSN memory 43 as will be described in greater detail with reference to FIGS. 1-12.

The first user device 10 and the second user device 12 may each be a portable device and/or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, industrial controls or machinery, a video game console, and/or any type of home, industrial, or office computing equipment.

The DS processing unit 14, one or more of the DS storage units 44, the storage integrity processing unit 16, and the one or more DS managing unit(s) 18 each may be a portable device or a fixed device or may be a functional module within another larger unit that is a portable device or a fixed device. For example, the DS managing unit may be a computer server and the storage integrity processing unit may be a functional module operating on the same computer server as the DS managing unit. In another example, the DS processing unit may be a functional module operating on the same smart phone as one of the DS storage units. Integration, inclusion, and/or distribution of the function of the units 14, 16, 18, and one or more of units 44 may be done on a stand alone server, workstation, PC, or computer platform basis, or may be partially integrated, fully integrated into one or more computing devices as an aggregate device.

The network 20 shown in FIG. 1 may be a wire-lined and/or wireless communication system or system of various communications systems that provide communications capability between the devices and other units or networks. The system of systems may be a combination of private intranets and the public internet, or other network structures. In an example, the DS processing unit 14 may have access to the network 20 by way of an optical sub-network while the second user device has access to the network by way of a 4G Long Term Evolution (LTE) wireless network. In other cases, a server or user device in FIG. 1 may be connected to networks and other devices by many different structures or methods, such as all of Bluetooth, 802.11(g), WiFi, Ethernet, optical, RF, and yet other communication choices.

In one embodiment, the first user device 10 includes a computing core 22 and an interface 24 to communicate with the DS processing unit 14 in FIG. 1. The interface 24 accommodates one or more storage system standards such that the first user device 10 can utilize a storage standard native to its operating system. The computing core 22 may include several additional processing functions, such as a processing module, a main memory, and a memory controller, as will be described in greater detail with reference to FIG. 2.

In one embodiment, the DS processing unit 14 includes an interface 26 to the first user device 10, and a dispersed storage network (DSnet) interface 28 to communicate with the network 20 in a format compatible with the rest of the computing system. For example, the DSnet interface 28 may transmit data to one or more of the DS storage units in a compatible format that allows storage of the data on within one or more of the DS storage units 44. Note, even though the DS storage units share the same label in FIG. 1, each DS storage unit may be a very different piece of computer hardware or may contain very different software from one unit to the other. The interface 26 to the first user device 10 accommodates one or more storage system standards such that the first user device 10, or other user devices, can utilize a storage standard native to their operating system. A user ID 30, a password 33 and an OS filename 32 may be included in the communications between the device 10 and the unit 14 of FIG. 1, where the OS filename 32 is compatible with the OS of the user device 10 and the password 33 and user ID 30 facilitate authentication of the user access. In one embodiment, the OS filename is the first virtual address for a data object that is stored to and eventually retrieved from the dispersed storage network of FIG. 1.

In one embodiment, the storage integrity processing unit 16 includes a DSnet interface 42 to communicate in a format compatible with the rest of the computing system. For example, the DSnet interface 42 may receive data from one or more of the DS storage units 44 in a format that allows the system to decode the data from the DS storage units 44. In an example of operation, the storage integrity processing unit 16 scans the contents of the DSN memory with an integrity test to detect undesired conditions including data corruption, outdated data, missing data, offline DS storage units, DS storage unit site failures, security breaches, network outages, and other data-impacting events or conditions. The storage integrity processing unit 16 may rebuild a portion of the data in the DSN memory and alert the DS managing unit when undesired conditions are detected that may be threatening full data integrity and recovery.

The storage integrity processing unit 16 improves the integrity of the data by detecting data errors, determining the type of data errors, and rebuilding the data before data is permanently lost in the system. The storage integrity processing unit 16 rebuilds the data based in part on the type of data error, by recovering available data, processing the recovered data to produce reconstructed data, and storing the reconstructed data in the DSN memory. One or more of the user devices 10 or 12, DS processing unit 14, DS storage unit(s) 44, and DS managing unit(s) 18 may perform one or more of the tasks to detect data errors and rebuild the data in some embodiments.

In one embodiment, the second user device 12 includes a computing core 36 and a DSnet interface 40 to communicate in a format that is compatible with the rest of the computing system. For example, the DSnet interface 40 may transmit data to one or more of the DS storage units 44 in a format that enables the DS storage units 44 to store the data on the DS storage units 44. The computing core 36 may include a DS processing module 38 and/or other functional units such as a processing module, main memory, and a memory controller as will be described in greater detail with reference to one exemplary computing core in FIG. 2. The DS processing module 38 of FIG. 1 may perform a similar function as the DS processing unit 14 of FIG. 1, thus eliminating the need for an external DS processing unit 14 attached to the second user device 12. In other words, the DS processing module 28 of the second user device 12 enables the second user device to directly store data to and/or retrieve data from the DSN memory utilizing the virtual addressing scheme of the DSN memory without needed an external or additional hardware or software component to be added to the user device, like unit 14 for user device 10. The virtual addressing scheme of the DSN memory 43 is the second virtual address for a data object that is stored to and retrieved from the dispersed storage network.

The functions of the DS managing unit(s) 18 may include one or more of authenticating user access, authenticating the user device, authenticating the DS processing unit, authenticating the DS storage unit, authenticating the storage integrity processing unit, authenticating other DS managing units, receiving and aggregating network management alarms, alerts, errors, status information, performance information, and handling messages from any of the modules and units within the computing system. For example, the DS processing unit 14 may transmit a simple network management protocol (SNMP) message regarding the status of the DS processing unit 14 via the network 20 to the DS managing unit 18. The DS managing unit 18 functions may also include functions to configure the computing system and perform a billing function for the computing system. For example, the DS managing unit may determine the number of DS storage units 44 to configure to meet the operational requirements of a particular user. The configuration of units 44 may include assignment of DSN memory addresses and the specification of security parameters for the entire computing system or for each user device. Security parameters may include one or more of authentication and permission procedures, authentication and permissions lists, encryption/decryption type, encryption keys, key generation type, and/or data encoding/decoding type.

In another example, one or more DS managing unit(s) 18 may track the usage of the DSN memory by the user to create a summary and/or bill. One or more DS managing units (18) may also automatically determine optimization of the configuration of the computing system based in part from determining the correlation of past and present configurations along with performance tracking. The DS managing unit may share the correlation and configurations with other computing systems managing a different DSN memory to further optimize the entire computing system shown in and around FIG. 1.

In another example, one or more DS managing unit(s) 18 may authenticate each system element, module, and unit upon user registration, system start up, a periodic timed interrupt, maintenance requires, or during a specific user transaction. The authentication determines if each system element (e.g., the user device, the DS processing unit(s), the DS storage unit, the DS managing unit, the storage integrity processing unit, etc) is actually the system element that is required, in order to avoid computing system use by unauthorized non-computing system elements. The DS managing unit(s) 18 may determine permissions for system elements attempting to carry out functions, including those on behalf of a user. The permissions verification determines if each system element is allowed to carry out activities within the computing system to avoid computing system use in an unauthorized fashion. A DS managing unit 18 may determine that a system element is a valid system element, but it may not be granted permission to perform a particular task such as writing to a particular portion of the DSN memory 43. System elements generally perform system tasks (e.g., system maintenance, administration, and configuration) or tasks on behalf of a user for an active transaction (e.g., writing or reading the data object to or from the DSN memory). The DS managing units 18 may authenticate and verify permissions for all of these categories. System elements may verify the permissions of a different system element when the different system element makes a request to the system element. For example, a DS storage unit 44 may verify the permissions of a DS processing unit 14 when the DS processing unit requests that the DS storage unit store data prepared by the DS processing unit. The authentication and permissions steps of the computing system will be discussed in greater detail with reference to FIGS. 4-12.

The plurality of DS managing units 1 through M may divide the management tasks by one or more of a user population, function type, computing system elements, DSN address space, by a loading algorithm, and/or any other way to divide the authentication and permissions verification tasks and data. In one example, DS managing unit 1 is responsible for managing a first group of users (e.g., all part of the same organization or subscribers to a DSN provider), and DS managing unit 2 is responsible for managing a second group of users. The utilization of the plurality of DS managing units will be discussed in greater detail with reference to FIG. 4.

In an example of operation of the computing system of FIG. 1, the computing core 22 of the first user device 10 initiates the sequence to store data to the DSN memory 43 by transmitting the data object via the first user device interface 24 to the DS processing unit interface 14. The data object may include a data file, data blocks, a real time data stream or any other format of passive or active digital information. The protocol of exchange may include the user ID 30, password 33, and the OS filename 32 to mimic a conventional file system interface and may be any one or more of network file system (NFS), flash file system (FFS), disk file system (DFS), small computer system interface (SCSI), internet small computer system interface (iSCSI), file transfer protocol (FTP), and web-based distributed authoring and versioning (WebDAV).

The DS processing unit 14 may authenticate the user and/or user device 10 by verifying with the DS managing unit 18 that the user is on an authentication list based in part on the user ID and password. The DS processing unit may verify the user device 10 has the proper permissions to store data on the DSN by verifying with a permissions list of the DS managing unit 18 that the user has the appropriate level of permissions/authority/access.

Once authentication is completed successfully, the DS processing unit 14 receives the data and processes it to create sets of error coded (EC) data slices. The data, or data object, is broken down into Y data segments, potentially encrypted, error coded, and sliced into X (e.g., X=16 slices wide, or any other number) slices per segment, thus creating X*Y total error-coded data slices. The number of slices X per segment is also called the number of pillars n and is chosen as a function of the error coding objectives. The size of the data segments is a function of what is chosen for Y and the overall size of the data object. The size of each error coded data slice is a function of the size of the data segment and the error coding algorithm.

The DS processing unit 14 creates a unique slice name for each EC data slice and attaches the slice name to each EC data slice. The slice name includes universal DSN memory addressing routing information and user-specific information based on the OS filename to tie the two together.

The DS processing unit 14 transmits the EC slices 1 through X, and attached slice names, for each data segment via the DSnet interface 28 and network 20 to the DS storage units 44 in the DSN memory 43 to request that the DS storage units 44 store the EC data slices in a distributed and more secure manner. The DS storage unit 44 may authenticate the DS processing unit request by performing verification/authentication operations with the DS managing unit 18. These steps are done to ensure that the user and/or DS processing unit 14 is on a proper authentication list and have proper system use clearance, based in part on the user ID and password. The DS storage unit 44 may verify that the user device 10 has the proper permissions to store data on the DSN by verifying permissions in a DS managing unit permissions list.

Note that each system element may interface with most of the other system elements substantially through the network 20 (e.g., the Internet or another relatively non-secure network) where security concerns may be higher. Further note that in this example, the computing system authentication and permissions check may be carried out by at least two levels of system elements (e.g., the DS processing unit and the DS storage unit), and by n spans (e.g., the pillar width for DSN memory storage) to improve security. In order to breach the security of the system, an improper user must trick many different resources in the system of FIG. 1 across many different security levels, geographic location, physical ownership, hardware/software type, etc.

The DS storage units 44 translate the virtual DSN memory address of the slice name into a local physical address for storage when the DS processing unit 14 has been successfully authenticated and permissions checked. In this one embodiment, each EC slice, for the same data segment, is stored on a different DS storage unit from all the other slices of that data segment to improve data integrity and security over time. The process concludes when the EC slices for the last data segment Y are stored in the DSN memory 43 at some final location. Note that the above process describes a write operation, where user data from a user device is written into the system. The above authentication process work nearly the same for all sorts of system functions, like data reads, writes, data modify, data delete, and data query, status check, or list operations.

In another example (a read operation example) of operation of the computing system, the computing core 36 of the second user device 12 initiates a data retrieval sequence by activating the DS processing module 38 to transmit retrieval messages (e.g., including the user ID, password, and DSN address) to the DSN memory 43 via the DSnet interface 40 and network 20. The retrieval messages are received by the DS storage units 44 that should contain the EC data slices generated from the original data object during the storage process.

The DS storage unit(s) 44 may authenticate the second user and/or second user device 12 by verifying with the DS managing unit 18 that the second device user is on an authentication list based in part on the user ID and password. The DS storage unit may verify the second user device 12 has the proper permissions to read data on the DSN by verifying with the DS managing unit permissions list that the user has the appropriate level of permissions.

It is possible that some of the data that is desired for reading by the user has become corrupted, tampered, or is missing since it was originally stored. The DS storage units 44 read the available EC data slices, generated from the original data object, from the internal memory devices of the DS storage units 44 and transmits the EC slices via the network 20 and DSnet interface 40 of the second user device 12 to the DS processing module 38 of FIG. 1. Some EC slices may be missing, tampered, or corrupted. The DS processing module decodes the EC slices in accordance with an information dispersal algorithm (IDA) or a like process to produce the original data object, even if some data is corrupted or missing. The DS processing module 38 may perform an integrity test on the decrypted, de-sliced, and decoded data to produce the original data object. The original data object is sent to the computing core 36 that requested the data. The methods to produce the decrypted, de-sliced, and decoded data will be discussed in greater detail with reference to FIG. 3.

The above example retrieval sequence would be similar if the first user device initiates the retrieval request. In such an example, the computing core 22 of the first user device 10 requests the data object retrieval using a standard memory access protocol associated with the OS of the first user device utilizing the OS filename 32 and the password 33. The DS processing unit 14 performs the same tasks as in the above described example to retrieve the EC slices from the appropriate DS storage units 44 to reconstruct the data object and provide it to the first user device 10 via the interface 24 to the computing core 22.

Figure 2:
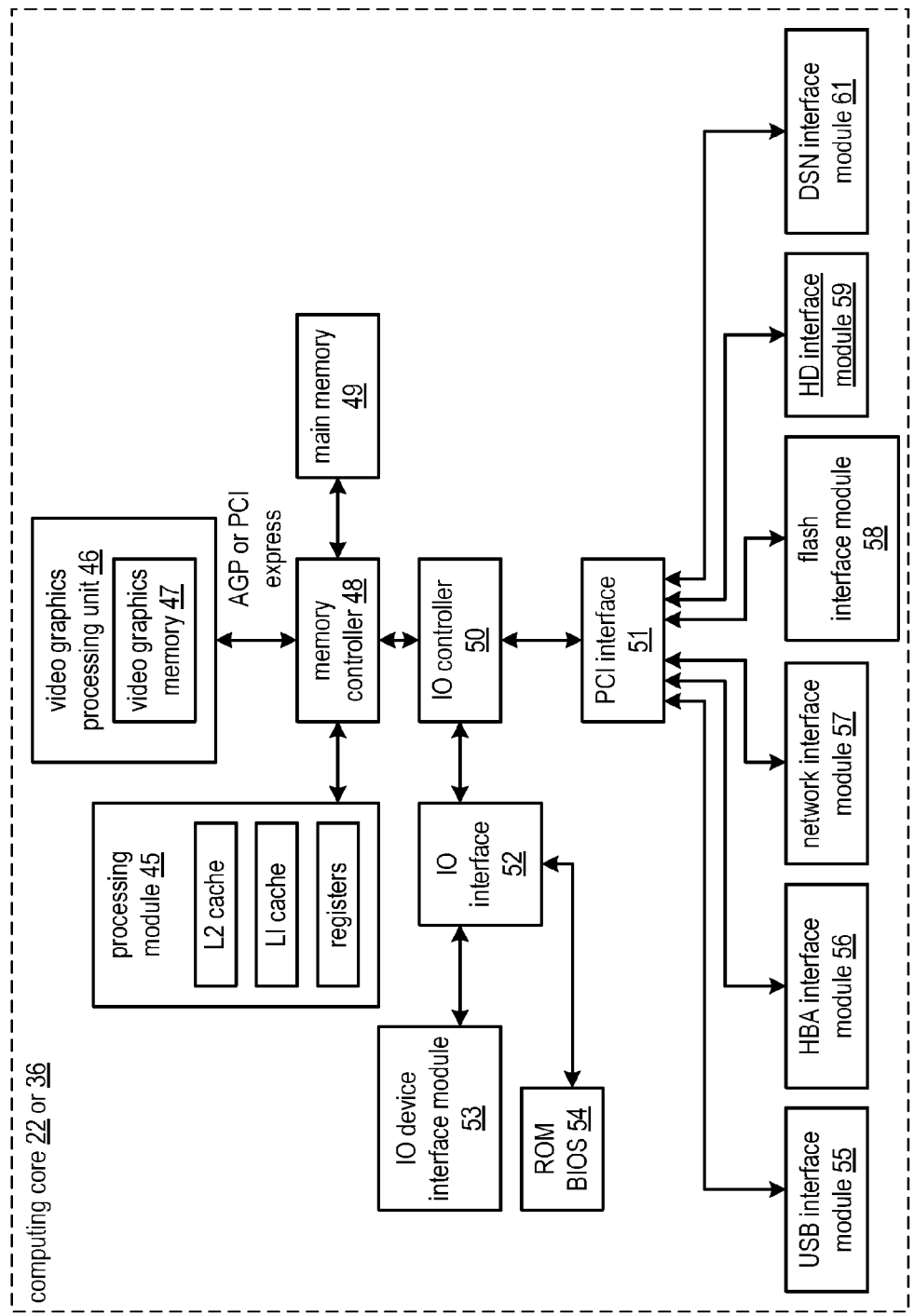
FIG. 2 is a schematic block diagram of an embodiment of a computing core from FIG. 1 in accordance with the invention.

FIG. 2 is a schematic block diagram of an embodiment of a computing core 22 or 36 that includes a processing module 45 containing L1 and L2 cache and registers, a memory controller 48, a video/graphics processing unit 46, a main memory 49, an input output (TO) controller 50, an input output (TO) interface 52, an input output (TO) device interface module 53, a read only memory basic input output system (ROM BIOS) 54, a peripheral component interconnect (PCI) interface 51, a universal serial bus (USB) interface module 55, a host bus adapter (HBA) interface module 56, a network interface module 57, a flash interface module 58, a hard drive (HD) interface module 59, and a DSN interface module 61.

A computing core similar to cores 22 or 36 may be included in the user devices 10 and 12, the DS processing unit 14, the DS storage units 44, the storage integrity processing unit 16, the DS managing unit 18, and/or any other device or unit that is part of or coupled to the computing system of FIG. 1. Some computing core elements may be external to the computing core. For example, the video graphics processing unit may be a separate printed circuit board (PCB) or computer card with specialty integrated circuits to render/display/process video and/or graphics images. The video graphics processing unit 46 may interface within or around the computing core 22 or 36 utilizing a standard such as an accelerated graphics port (AGP) or peripheral component interconnect express (PCIe) bus.

The DSN interface module 61 may be all or partially a part of the computing core 22 or 36, meaning some or all of the functionality of the module 61 may be inside or outside the semiconductor die or semiconductor package that comprising the core 22 or 36. For example, a portion of the DSN memory interface module function may be part of the computing core 22 of the user device 10 and part of the computing core of the DS processing unit 14 of FIG. 1.

Computing core modules, interfaces, and controllers may each include one or more integrated circuits to perform their function alone or in combination with executable computer instructions. The executable computer instructions may be programmed into the integrated circuit or loaded into a memory associated with the computing core for execution by the processing module. For example, the ROM BIOS 54 may contain executable computer instructions that are loaded into the main memory 49 and executed by the processing module 45 upon initial start of the computing core 22 or 36.

In an embodiment, the processing module 45 (which may be a single core, super-scalar, heterogeneous core, RISC, CISC, and/or multi-core processing unit) is the primary processor for the computing core coordinating a majority of tasks (e.g., execute one or more operation instructions of an algorithm, perform an interrupt, perform a co-processing function, process data, store data to memory, read data from memory, etc.) and often includes at least one L2 cache, at least one L1 cache, and programmable registers. The memory controller 48 coordinates the reading of data and writing of data within the core processing unit 22 or 36. For example, data for display renderings may be routed to and from the video graphics processing unit 46 while data for routine operations may be routed to and from the main memory 49. The video graphics processing unit 46 may include a video graphics memory 47.

The 10 controller 50 provides access to the memory controller 48 for typically slower devices. In one embodiment, the IO controller 50, via the PCI interface 51, provides functionality between the memory controller 48 and the DSN memory utilizing an electrical connection and a protocol standard. For example, a local area network (LAN) and/or wide area network (WAN) may interface with the network interface module (e.g., module 57) utilizing a network file system (NFS) standard. A flash memory may interface with the flash interface module 58 utilizing a flash file system (FFS) standard. A hard drive may interface with the HD interface module 59 utilizing a disk file system (DFS). The DSN memory may interface with the DSN interface module 61 utilizing a series of standards including NFS, FFS, DFS, and more. For example, the DSN interface module 61 of the first user device 10 of FIG. 1 may utilize NFS to communicate data objects to/from the DSN memory. In another example, the DSN interface module 40 of the second user device 36 of FIG. 1 may communicate error coded data slices to/from the DSN memory over one or more networks similar to network 20.

Portions of the interface modules 55-61 along the bottom of FIG. 2 may have capabilities such that they can be directly coupled to the IO controller 50 or directly to the memory controller 48. For example, the DSN interface module 61 may be directly coupled to the memory controller 48, and as such may perform operations in a more timely and effective direct-connected manner.

The IO interface 52 couples the memory controller 48, via the IO controller 50, to other computing core elements including the ROM BIOS 54 and the IO device interface module 53. The IO device interface module 53 may provide the interface for a variety of slower and common IO devices including a keyboard, a mouse, a printer, a removable CD/DVD disk drive, and/or any other IO device.

In an example of operation, the processing module 45 retrieves data (e.g., a media file) from the main memory 49 routing it through the memory controller 48, the IO controller 50, the PCI interface 51, and the DSN interface module 61 on to the DSN memory over network 20 for short or long term storage.

Figure 3:
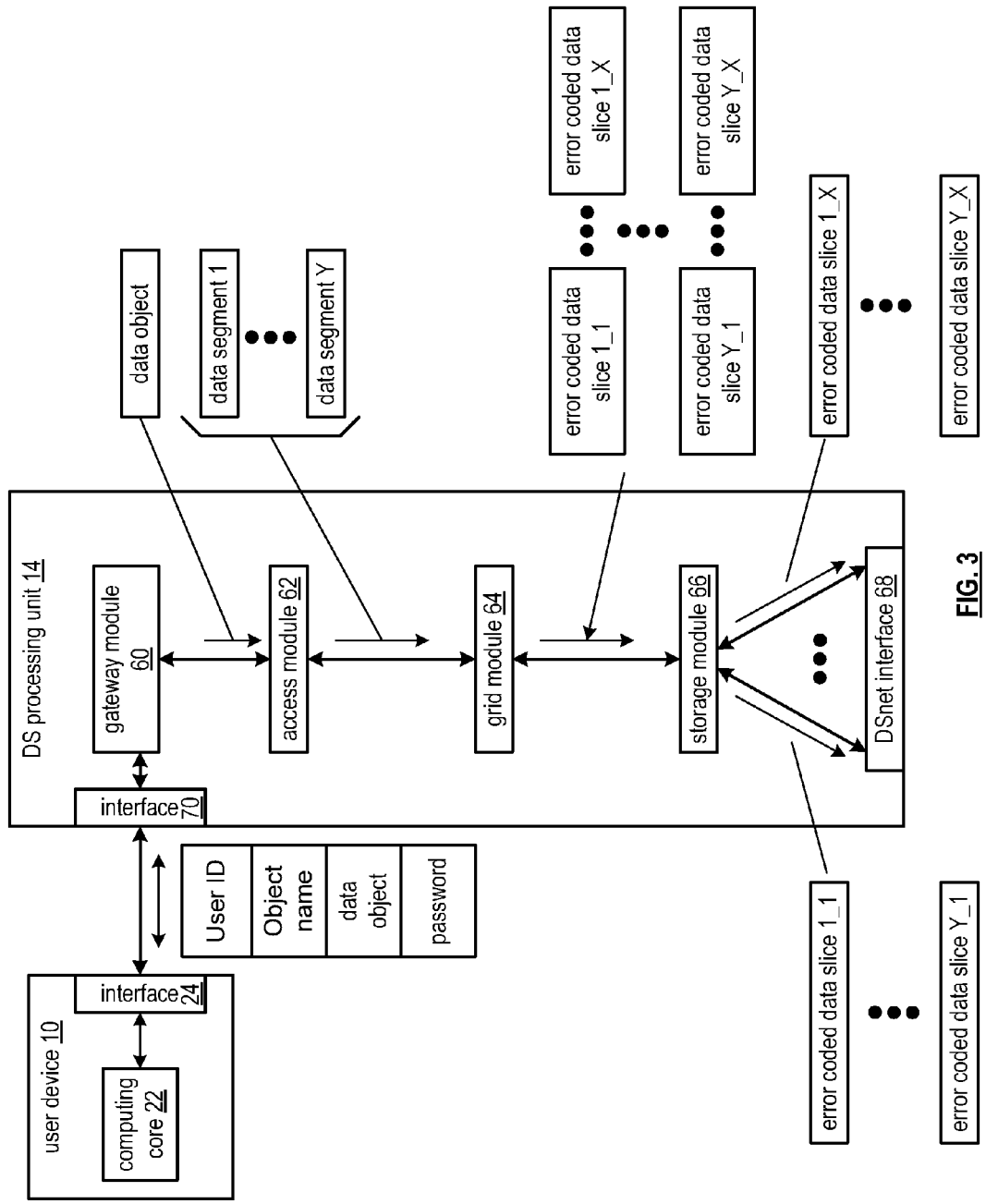
FIG. 3 is a schematic block diagram of an embodiment of a dispersed storage processing unit from FIG. 1 in accordance with the invention.

FIG. 3 is a schematic block diagram of an embodiment of a dispersed storage (DS) processing unit 14 that includes the interface 70, a gateway module 60, an access module 62, a grid module 64, a storage module 66, and the DSnet interface 68. In another embodiment, one or more of the gateway module 60, the access module 62, the grid module 64, and/or the storage module 66 may be implemented outside of the DS processing unit. The DS processing unit performs functions that include one or more of authenticating user requests, transforming incoming data objects (e.g., files, blocks, streams) from the interface 70 into error coded (EC) data slices which the DS processing unit 14 then stores in the DSN memory 43 of FIG. 1 via the DSnet interface 68 of FIG. 3. The DS processing unit 14 of FIG. 3 retrieves EC data slices from the DSN memory 43 of FIG. 1 and transforms the EC data slices into original data objects, which the DS processing unit 14 then communicates to a user or user electronic device via the interface 70.

The interface 70 of the DS processing unit 14 is coupled to the interface 24 of the first user device 10. The interfaces may be logical, within a package on a multi-chip-module, signals across a printed circuit board (PCB) or integrated on a silicon die if the DS processing unit 14 is part of the second user device 12 as shown via module 38 in FIG. 1. The interfaces collectively form a DSN memory interface to accommodate the OS file system of any user device such that, from the perspective of the user device(s), data objects may be stored to and retrieved from the DS processing unit 14 or module 38 as if the DS processing unit 14 or module 38 were any other compatible storage system.

The gateway module 60 couples the interface 70 to the access module 62 and may include functions to act as a portal between the user device 10 or 12 and the DS processing unit 14 or module 38 allowing them to communicate between protocols thereby providing computing system interoperability. The gateway module 60 converts protocols and messages as a function of the user device OS file system. For example, the gateway module 60 may convert a retrieve-file message in the NFS protocol format from the first user device 10 to a dispersed storage network message in the dispersed storage network protocol to trigger the DS processing unit 14 to retrieve certain data and return it to the first user device 10. The gateway module 60 may include other functions, such as providing access control to prevent unauthorized use (e.g., permissions check), user identification (e.g., authentication), user information retrieval, traffic monitoring, statistics generation, DS processing unit configuration, and DS processing unit management. The gateway module 60 may provide user access authentication to verify a user has permissions to perform one or more DSN memory access functions including write, read, delete, list, status, configure, and/or other functions that require access to the DSN memory.

The gateway module 60 may access user information in the DS managing unit(s) 18 based on the user identification. The gateway module 60 receives the user identifier (ID) and password as shown in FIG. 3, to enable the look up of a vault identifier (e.g., in the DS managing unit 14). A vault may be associated with each user or a plurality of users and may contain security parameters and user attributes (e.g., who the user is, billing data, user location, user priority, user contact info, etc.), operational parameters, and a list of the DS storage units 44 that may be utilized to support that user. One or more vaults may be established from the same set of DS storage units 44 in different combinations. The vault identifier may be utilized to distinguish between vaults. For example, vault 1 (for user 1) may utilize DS storage units 3, 10, 31, 46, 52, 55, 65, and 68 (X=8 wide) while vault 2 (user 2) may utilize DS storage units 3, 8, 31, 26, 40, 45, 46, 49, 55, 57, 58, 60, 62, 63, 68, and 72 (X=16 wide). In essence, the assignment of DS storage units to users or data files can hierarchical, run by any number of algorithms that can load, usage, and/or bandwidth balance, be round robin, or be random to ensure resources are properly distributed and balanced.

The operational parameters may also include one or more of the security parameters, a data manipulation table, the error coding algorithm, the width X (n number of pillars or slices per segment for this vault), the threshold T (described below, also referred to as k), the encryption algorithm, a slicing parameter, a compression algorithm, an integrity check method, caching settings, parallelism settings, and/or other parameters that may be used to access the DSN memory 43 of FIG. 1.

In FIG. 3, the gateway module 60 may access user information from the vault associated with the user from any one or more sources including the DS managing unit(s) 18 of FIG. 1, the user devices 10 or 12, the DSN memory 43, and/or another source external to the computing network. The gateway module 60 may access the authentication list and permission list sourced from one or more DS managing units 18 to authenticate the user and the transaction performed by or for the user. The gateway module 60 may determine a source name to associate with the data object. The source name may contain a data name (block number or a file number), a vault generation number, the reserved field, and the vault identifier. The data name may be randomly assigned but it is always associated with the user data object. The gateway module 60 may pass the user information, security parameters, source name, and data object to other elements of the DS processing unit 14 to assist in the operation, as will be described in greater detail with reference to FIGS. 4-12.

In an embodiment, the access module 62 may communicate data objects, user information, security parameters, and the source name with the gateway module 60, and communicate data segments, codec flags, user information, and the source name with the grid module 64. The access module 62 may create a series of data segments 1 through Y from the data object to be stored, and may attach one or more codec flags. In one embodiment, the number of segments Y is chosen (e.g., part of the user information) to be a fixed number for a given user vault, but the size of the segments varies as a function of the size of the data object that is to be stored. For instance, if the data object is a image file of 4,194,304 eight bit bytes (e.g., 33,554,432 bits) and the number of segments Y=131,072, then each segment is 256 bits or 32 bytes. In another embodiment, the number of segments Y is a variable number based on the size of each data file with the objective to have a constant size of the data segments (e.g., data segment size is specified in the user information). For instance, if the data object is a image file of 4,194,304 bytes and the fixed size of each segment is 4,096 bytes, the then number of segments Y=1, 024. The access module 62 may include the source name and the security parameters in (or along with) each data segment before passing the data segment to the grid module 64.

The grid module 64 may pre-manipulate (e.g., compression, encryption, cyclic redundancy check (CRC), etc.) the data segment in accordance with certain selected or required security parameters before creating X error coded data slices for each data segment. Multiple data manipulation steps may be required as indicated by the security parameters that have been set.

The grid module 64 creates X*Y error coded data slices for the Y data segments of the data object. The grid module adds forward error correction (FEC) bits to the data segment bits in accordance with one or more error coding algorithms (e.g., Reed-Solomon, Convolution encoding, Trellis encoding, etc.) to produce an encoded data segment. The grid module 64 determines the slice name and attaches the unique slice name and the codec flag to (or associated with) each EC data slice.

The number of pillars, or slices X, per data segment (e.g., X=16) is chosen as a function of the error coding objectives. A read threshold T (e.g., T=10) of the error coding algorithm is the minimum number of error-free error-coded data slices that are required to be able to reconstruct an original data segment. The DS processing unit 14 (see FIG. 1) can compensate for X-T (e.g., 16−10=6, also referred to as n−k) missing error coded data slices per data segment and still recover the original data segment.

The grid module 64 slices the encoded data segment to produce the error coded data slices. The slicing complements the error coding algorithm and accommodates the operation of dispersing error-coded data slices to different DS storage units 44 of the DSN memory 43. The grid module 64 may use interleaving to slice the encoded data segment, such that if an entire error coded slice is lost it may not destroy a large contiguous portion of the data segment thereby preventing reconstruction.

The size of each error-coded data slice is a function of the size of the data segment and the error coding algorithm. The size of each error-coded data slice is the size of the data segment divided by the threshold T. For example, if the data segment is 32 bytes and the threshold is 10, then each error coded slice (without any addressing) is about 4 bytes.

The grid module 60 may perform post-data manipulation on the error coded data slices where the manipulation may include one or more of slice level compression, encryption, CRC, addressing, tagging, and/or other manipulation to improve the effectiveness or security of the computing system. The post-data manipulation may be performed in accordance with the security parameters.

The grid module 60 may determine specifically which DS storage units 44 in which to store each error coded data slice. Such an assignment may be based in part on a dispersed storage memory mapping associated with the user's vault. The location determination may also be based in part on DS storage unit attributes including one or more of availability, self-selection, level of security required, personal preference, performance history, link speed, link latency, ownership, available memory, domain, cost, and more generally on one or more of a prioritization scheme, a centralized selection message from another source, a lookup table, who owns the data, and/or any other factor to optimize the operation of the computing system. The grid module 64 may pass the DS storage unit determinations on to the storage module 66 so that the storage module 66 can direct the EC data slices properly.

In one embodiment, the number of DS storage units 44 is equal to or greater than the number of pillars (slices X per segment) so that no more than one error-coded data slice of the same data segment is stored on the same DS storage unit 44 in some geography. Further, the storage units selected can be limited by site, location in a data center, etc., so that no two units that store a slice of the same original data file or source are in close proximity to each other and subject to similar environmental conditions, support infrastructure, etc. Error coded data slices of the same slice number but of different segments (e.g., EC data slice 1 of data segment 1 and EC data slice 1 of data segment 2) may be stored on the same or different DS storage units 44. The grid module 60 may pass the EC coded data slices with DS storage unit determinations (e.g., the DS storage unit numbers) to the storage module 66 of FIG. 3.

The storage module 66 may perform integrity checks on the EC data slices and then transmit the EC data slices 1 through X of each segment 1 through Y to the DS storage units 44 according to the previous location determination via the DSnet interface 68 with the password. The DS storage units 44 may store the EC data slices and locally keep a table to convert virtual DSN addresses into physical storage addresses when the DS storage unit 44 successfully authenticates and verifies permissions for the DS processing unit store request.

In an example of operation, the first user device 10 of FIG. 1 sends a data file retrieval message to the DS gateway module 60 of the DS processing unit 14 (shown in FIG. 3 in detail). The data file retrieval message includes or is associated with a user ID and password. The gateway module 60 may authenticate the user and verify permissions (e.g., does this user have the right to perform this particular operation on these resources) as described earlier. The gateway module 60 may translate the data file retrieval re quest from the conventional file system interface into a retrieval message of a DSN memory interface convention. The grid module 60 may receive the retrieval message and determine where (e.g., which DS storage units) the EC data slices for each segment of the data file should be located. The storage module 66 may send a retrieval request including the user ID and password to retrieve the EC data slices from each of the determined DS storage units 44 in FIG. 1 and pass the retrieved EC data slices to the grid module 64 of FIG. 3. The storage module 66 may also authenticate the user and verify permissions as described earlier, especially if connections shown within the DS processing unit of FIG. 1 is exposed to a certain level of security or intrusion risks. The storage module 66 may only retrieve the threshold T number of EC data slices if they are known to be intact (e.g., no CRC errors, etc., as indicated by the DS storage unit 44 and/or by the grid module 60). The grid module 60 may de-slice the EC data slices and decode the de-sliced data in accordance with the error coding algorithm to produce the data segments. The grid module 60 may perform data de-manipulation, such as decryption, on the data segments in accordance with the security parameters, as required. The grid module 60 may pass the de-manipulated data segments to the access module 62 which re-assembles the data file by aggregating the data segments in order. The access module 62 may pass the data file to the gateway module 60 which converts the format to the file system protocol of the first user device 10. In this manner, very secure reads and writes (as well as other operations) are performed between user devices and DS memory shown in FIG. 1.

Figure 4:
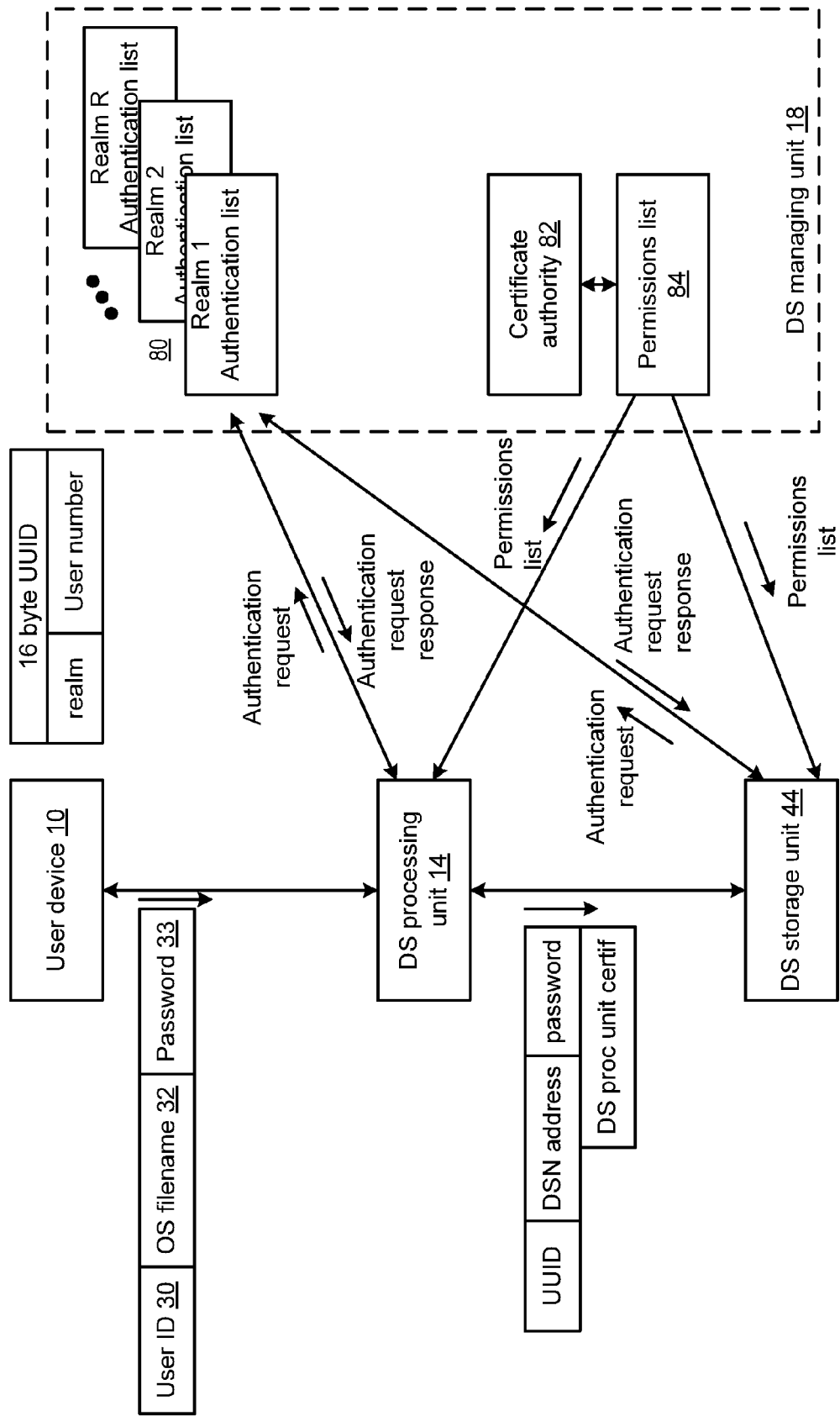
FIG. 4 is a schematic block diagram showing an embodiment of an authentication system in accordance with the invention.

FIG. 4 is a schematic block diagram of an embodiment of an authentication system that includes the user device 10, the DS processing unit 14, at least one DS storage unit 44, and the DS managing unit 18 similar to that shown via FIG. 1. The DS processing unit 14 and the DS storage unit 44 may access the DS managing unit 18 via the network 20 of FIG. 1 to authenticate and verify permissions, and the network 20 may be an open unsecured network that is subject to possible security breaches.

The DS managing unit 18 in FIG. 4 may include a permissions list 84, a certificate authority 82, and one or more authentications lists 80 which may be organized as realm 1 authentication list through realm R authentication list, where R is a positive integer greater than zero. The permissions list 84, certificate authority 82, and authentication lists 80 may be part of or contained within one or more of the DS managing units 18, DS processing units 14, DS storage units 44, user devices 10 or 12, and/or storage integrity processing units 16 of FIG. 1.

The permissions list 84 may be an access control list (ACL) which may contain a list of functions associated by DSN memory addresses that indicates which users or user devices have the permission(s) to perform certain operations and/or access certain parts of the system. The DS managing unit 18 may index into the list by a universal user identifier (UUID) (also known as a Universally Unique Identifier) that is output from the DS processing unit 14 shown in FIG. 4 or provided from another source. A UUID is assigned to each computing system user or user device and may include a realm part or identifier and a user number part or identifier. The user number part of the UUID may be assigned as a random number but will always be associated with the same user. The realm structure 80 may specify different portions of the DSN (e.g., different DSN providers or user groups) and may utilize a different authentication list for each realm. The DS managing unit 18 may receive a request to access the permissions list 84 to verify one or more of the users, some input data or operation, a system element acting on behalf of a user, or may be asked to authenticate or verify that the system element or user has the right permissions level to perform a requested function or system operation. The permissions list 84 may indicate which realm 80 a particular user belongs to. The DS managing unit 18 may respond to the request based on the permissions list contents or other authentication contents associated therewith.

The certificate authority (CA) 82 is a trusted third party part of a public key infrastructure (PKI) scheme where the CA 82 may receive a certificate signing request (CSR) from a system element (e.g., unit 14, device 10 or 12, unit 44, etc) where the CSR may be based in part on the user ID and a public key (e.g., paired to a secret private key generated and stored locally by the requester). The certificate authority (CA) 82 may respond to the request/CSR by issuing a signed certificate that the requesting system element may utilize in combination with its private key to access other system elements within the system.

The authentication lists 80 may utilize a lightweight directory access protocol (LDAP) format to store UUID information (e.g., UUID, user ID, name, organization, address, email, phone, billing information) for valid authorized users. The DS managing unit 18 may receive a request to authenticate the user, certain data or input, the system element acting on behalf of a user, or the system element. The DS managing unit 18 may respond to the request based on the authentication list contents.

The DS managing unit CA 82 may authenticate every system element (as described above) upon boot up, upon an occasional system interrupt, upon a check request issued by a computer or server, upon IT initiation, at random times, or from time to time. The DS managing unit 18 may send the authentication list information to authenticated system elements upon boot up, upon an occasional system interrupt, upon a check request issued by a computer or server, upon IT initiation, at random times, or from time to time.

In an example of a read operation, the user device 10 sends a read request to the DS processing unit 14 utilizing a network connection (e.g., network 20 of FIG. 1) to the DS processing unit 14 that may include a virtual private network (VPN) over the Internet and/or a protocol including hypertext transfer protocol secure (HTTPS), and common internet file system (CIFS). The read request may include the user ID 30, the OS filename 32, and a password 33 as shown in FIG. 4. Note that the password may be a hash of the user private key and a text string password as entered by the user, or some other secure password communication.

The DS processing unit 14 may determine the UUID for this user based on the user ID 30 and the permissions list 84. Note the permissions list 84 may be stored or cached locally at the DS processing unit 14 as a result of an earlier control list (ACL) publish from the DS managing unit 18. In other embodiments or for other operations, the DS processing unit 14 may request the permissions list 84 from another system element (e.g., the DS managing unit 18) by sending a permission list request, especially if the permissions list stored by the unit 14 is old, unavailable, etc. The permission list request may be based on the DS processing unit private key, and the signed certificate from the certificate authority 82. The DS processing unit 14 may receive the permissions list 84 and determine the UUID for this user for this read request.

The DS processing unit 14 may send an authentication request to the DS managing unit 18 where the request may be based on the UUID (including a realm ID to direct the request to the proper authentication list 80 when there are more than one list present), the DS processing unit private key, and the signed certificate from the certificate authority. The DS managing unit 18 may send an authentication request response to the DS processing unit 14 as shown in FIG. 4. The response may be favorable when the DS managing unit verifies that the certificate and UUID are valid and that the user is authorized to access at least a portion of the DSN. The response may not be favorable when the DS managing unit does not authenticate the request, whereby precautionary security measures and security recording/logging can take place.

The DS processing unit 14 may receive the authentication request response from the unit 18 of FIG. 4. The DS processing unit 14 may verify that the user request matches the allowed permissions by verifying the request against one or more permissions lists 84. The DS processing unit 14 may access the permissions list 80 via the UUID to obtain the permissions information. For example, the permissions may indicate that the user may only read data in a particular folder or file, at certain times, or under certain conditions. In another example, the permissions may indicate that the user may read, write, delete, update, or list data in a particular folder or file at any time and under any condition, etc. The DS processing unit permissions verification may be favorable when the permissions list indicates that the user has been verified and the user has permission to perform the requested operation, otherwise the verification may be unfavorable. Note that the DS processing unit 14 is acting as a secure proxy for the user to verify that the DS processing unit 14 is allowed to perform tasks associate with the request from the user device 10 on behalf of the user. Further note that the DS processing unit 14 must be a trusted system element to gain approval to carry out the system and user tasks.

The DS processing unit 14 may determine the virtual DSN address of the requested data object based on the OS filename and the user vault information as described with reference to FIG. 3 when the authentication and permissions checks are both favorable. The DS processing unit may send an error message to one or more system elements (e.g., the user device 10 and DS managing unit 18) when either of the authentication or permissions checks are unfavorable. If verification is favorable, the DS processing unit 14 may send read requests to the DS storage units 44 that contain the requested EC data slices for the requested data object based on the virtual DSN address and the DSN locations indicated by the virtual DSN address to physical locations table within the system. The read request may include the UUID, the DSN address shown in FIG. 4, the password 33 (or some modified version thereof), and the certificate based on the DS processing unit private key and the signed certificate from the certificate authority 82.

The DS storage unit 44 may receive the read request from the DS processing unit 14. The DS storage unit 44 of FIG. 4 may have the permissions list 84 also cached or stored locally. The DS storage unit 44 may request the permissions list 80 from another system element (e.g., the DS managing unit 18) by sending a permission list request when it does not have the permissions list or if the permissions list is outdated (e.g., older than a threshold amount of time). The permission list request may be based on the DS storage unit private key, and the signed certificate from the certificate authority. The DS storage unit 44 may then receive the permissions list and cache or store it locally with optional added information, like a time stamp.

The DS storage unit 44 may send an authentication request to the DS managing unit 18 of FIG. 4 where the request may be based on the UUID (including the realm to direct the request to the proper authentication list when there is more than one), the DS storage unit private key, and/or the signed certificate from the certificate authority. The DS managing unit 18 may send an authentication request response to the DS processing unit. The response may be favorable when the DS managing unit verifies that the certificate and UUID are valid and that the user is authorized to access at least a portion of the DSN needed to complete the request transaction, which in this example is a data read operation. The response may be unfavorable when the DS managing unit 18 does not authenticate the request.

The DS storage unit 44 may receive the authentication request response. Upon authentication, the DS storage unit 44 may verify the user request matches the allowed permissions by verifying the request against the permissions list 84, either in the unit 18 or cached locally in the unit 44. The DS storage unit 44 may access the permissions list via the UUID to obtain the permissions information. For example, the permissions may indicate that the user may only read data in a particular folder or file, at a certain time, from a certain location only, etc. In yet another example, the permissions may indicate that the user may read, write, delete, update, list data in a particular folder or file. The DS storage unit 44 permissions verification may be favorable when the permissions list indicates that the user has permission to perform the requested operation, otherwise the verification may be unfavorable. Note that the DS storage unit 44 is acting as a proxy for the user and/or the unit 14 to verify that one or all of the user device 10, the DS processing unit 14, and the DS storage unit 44 is allowed to perform tasks associated with the request from the user device on behalf of the user. As such, the DS storage unit 44 may authenticate and verify permissions for each of the user device 10 and the DS processing unit 14 that came before it in this verification sequence. Further note that the DS storage unit must be a trusted system element to gain approval to carry out the system and user tasks.

If authentication and verification is all favorable so far, the DS processing unit 14 may retrieve one or more EC data slices for the virtual DSN address of the requested data object based on a local DS storage unit virtual DSN address. The retrieval is stored by the unit 14 to the DS storage unit memory device and address location table lookup when the authentication and permissions checks are all favorable. The DS storage unit 14 may send an error message to one or more system elements of FIG. 1 (e.g., the user device 10, DS managing unit 18, etc.) when either of the unit 14 or unit 44 authentication or permissions checks that were previously discussed are unfavorable. The DS storage unit 44 may send the EC data slice for the requested data object to the DS processing unit 14 where the DS processing unit 14 may re-construct the data object as discussed above in FIGS. 1-3 and send it to the user device 10 of FIG. 1. Given that the network 20 of FIG. 1 is the element that normally connects device 10, unit 14, unit 44, and unit 18 together in FIG. 4, these multiple security checks at each unit are needed to ensure the security of the data, the user, and the transaction.

Figure 5:
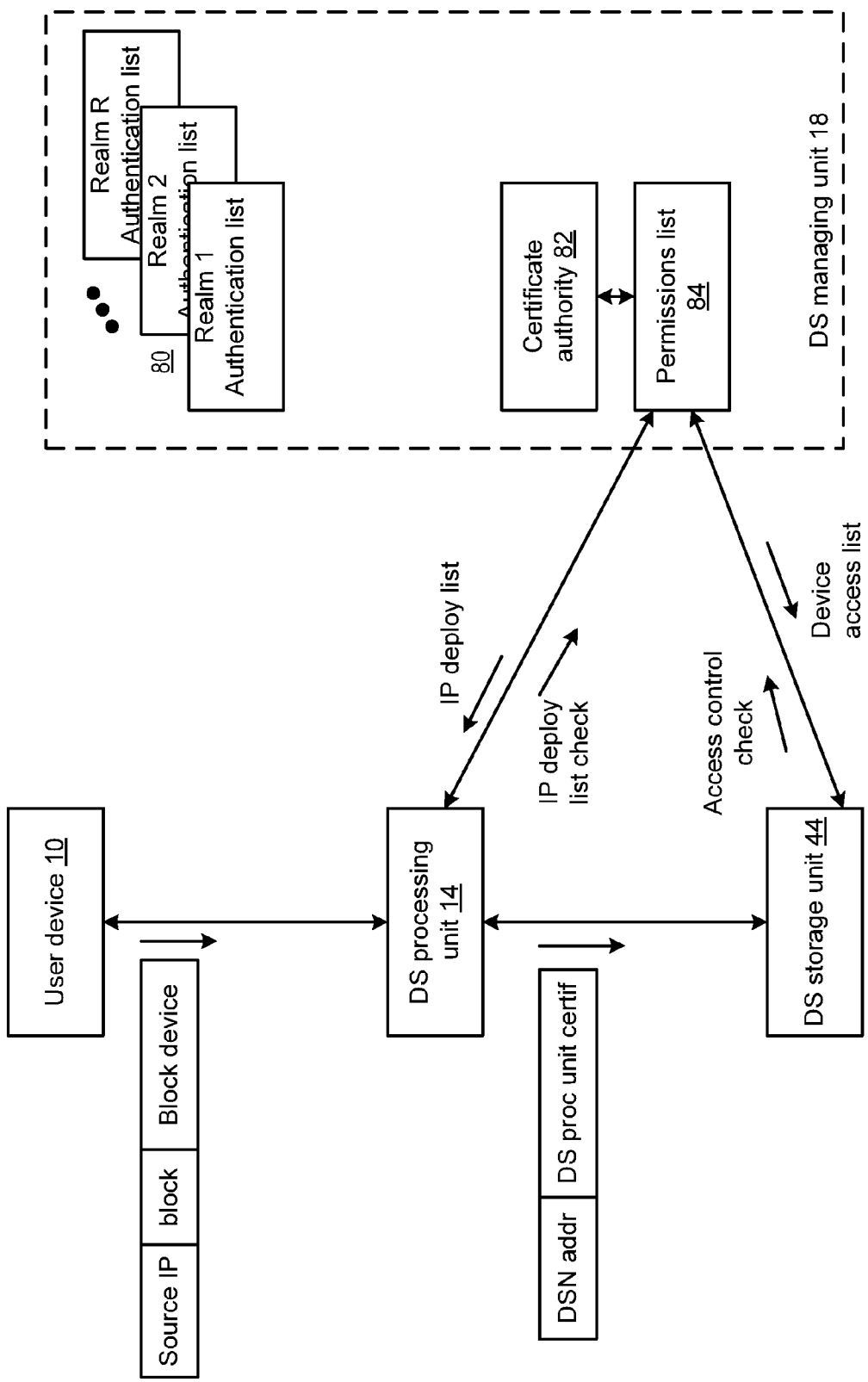
FIG. 5 is a schematic block diagram showing another embodiment of an authentication system in accordance with the invention.

FIG. 5 is a schematic block diagram of another embodiment of an authentication system that includes the user device 10 or 12, the DS processing unit 14, the DS storage unit(s) 44, and the DS managing unit 18 of FIGS. 1-4. The DS processing unit 14 and the DS storage unit(s) 44 may access the DS managing unit 18 via the network to authenticate and verify permissions for users and/or certain requested data transactions over the network. In this embodiment, the user device 10 or 12 accesses their respective DS processing unit/module 14 or 38 over an internet small computer system interface (iSCSI) such that the user ID is identified to the DSN only by one or more of the internet protocol (IP) address and/or the iSCSI name.

The DS managing unit 14 may include a permissions list 84, a certificate authority (CA) 82, and one or more authentications lists 80 which may be organized as realm 1 authentication list through realm R authentication list, as also shown in FIG. 4, by way of example. The permissions list, certificate authority, and authentication lists may be part of one or more DS managing units 18, DS processing units 14, DS storage units 44, user devices 10 or 12, and/or storage integrity processing units 16.

The permissions list may be an access control list (ACL) which may contain a list of functions by DSN memory addresses that users have permission to perform. The ACL may include IP addresses and iSCSI names to accommodate iSCSI compatibility. The DS managing unit 18 may index into the list by the IP address, iSCSI name, or UUID. The DS managing unit 18 may receive an IP deploy list check to access the permissions list to verify the user, the system element acting on behalf of a user, the data the user is processing, or that the system element has the right permissions level to perform a requested function. The DS managing unit 18 may respond to the request based on the permissions list contents.

The certificate authority (CA) (similar to that shown in FIG. 4) is a trusted third party part of a public key infrastructure (PKI) scheme where the CA may receive a certificate signing request (CSR) from a system element where the CSR may be based in part on the user ID and a public key (e.g., paired to a secret private key generated and stored locally by the requester). The certificate authority (CA) may respond to the request by issuing a signed certificate that the system element may utilize in combination with its private key to access other system elements.

The DS managing unit CA may authenticate every system element (as described above) upon boot up or from time to time based on other conditions or initiations. The DS managing unit 18 may send a device access list to authenticated system elements (e.g., units 14 and 44) over the network 20 upon boot up or from time to time.

In an example of operation, the user device 10 sends a read request via the iSCSI protocol to the DS processing unit 14 utilizing a network connection to the DS processing unit 14 over the network 20. The network connection may include a virtual private network (VPN) over the Internet and a protocol including IP security. The read request may include the source IP, a block, and a block device indicator as shown in FIG. 5, as one example.

The DS processing unit 14 may determine if the source IP is in the permissions list. Note the permissions list (e.g., with authorized source IDs) may be stored locally at the DS processing unit 14 as a result of an earlier ACL publish operation/execution from the DS managing unit 18. The DS processing unit 14 may also request the permissions list from another system element (e.g., the DS managing unit) by sending an IP deploy list check, as needed. The IP deploy list may be based on the DS processing unit private key, and the signed certificate from the certificate authority. The DS processing unit 14 may receive the IP deploy list and determine if the source IP is allowed to access the DSN as requested by the user or a network device. The determination may be favorable when the DS processing unit verifies that the source IP is in the IP deploy list, and has certain permissions set properly in some cases. The response may be unfavorable when the DS managing unit does not find the source IP in the IP deploy list or finds certain prohibited transactions that affect the current transaction that is desired by the user or the network device.

The DS processing unit 14 may determine the virtual DSN address of the requested data object based on one or more of the block identifier, the block device, and the vault information shown in FIG. 5 for this source IP when the permissions check is favorable. The DS processing unit 14 may send an error message to one or more system elements (e.g., the user device 10 and DS managing unit 18) when the permissions check is unfavorable. The DS processing unit 14 may send read requests to the DS storage units 44 that contain the EC data slices for the requested data block based on the virtual DSN address and the DSN locations indicated by the virtual DSN address to physical locations table, as shown in FIG. 5. The read request may include the DSN address and the certificate based on the DS processing unit private key and the signed certificate from the certificate authority.

The DS storage unit 44 may receive the read request from the DS processing unit 14, if authentication is favorable. The DS storage unit 44 may have the permissions list (for authorized devices) stored or cached locally, where this data is in a current and usable form. However, the DS storage unit 44 may request the permissions list 84 from another system element (e.g., the DS managing unit 18) by sending an access control check when it does not have the permissions list or if the permissions list is outdated (e.g., older than a threshold amount of time) or corrupted. The access control check may be based on the source IP, DS storage unit private key, and the signed certificate from the certificate authority. The DS storage unit 44 may receive the device access list and store it locally. The DS storage unit 44 may access the device access list by the source IP to obtain the permissions information required to authenticate and continue the user data transaction. For example, the permissions may indicate that the user at this source IP may only read data in a particular folder or file. In another example, the permissions may indicate that the user may read, write, delete, update, list data in a particular folder or file. The DS storage unit device access list verification may be favorable when the list indicates that the user has permission to perform the requested operation, otherwise the verification may be unfavorable. Note that the DS storage unit 44 is acting as a proxy for the user to verify that the DS storage unit 44 is allowed to perform tasks associated with the request from the user device 10 on behalf of the user. Further note that the DS storage unit 44 must be a trusted system element to gain approval to carry out the system and user tasks.

The DS storage unit 44 may retrieve EC data slice for the virtual DSN address of the requested data object based on a local DS storage unit virtual DSN address to DS storage unit memory device and address location table lookup when the device access list permissions check is favorable. The DS storage unit 44 may send an error message to one or more system elements (e.g., the user device 10 and DS managing unit 18) when the access list permission check is unfavorable. The DS storage unit 44 may send the EC data slice for the requested data block to the DS processing unit 14 where the DS processing unit 14 may re-construct the data block and send it to the user device 10.

Figure 6:
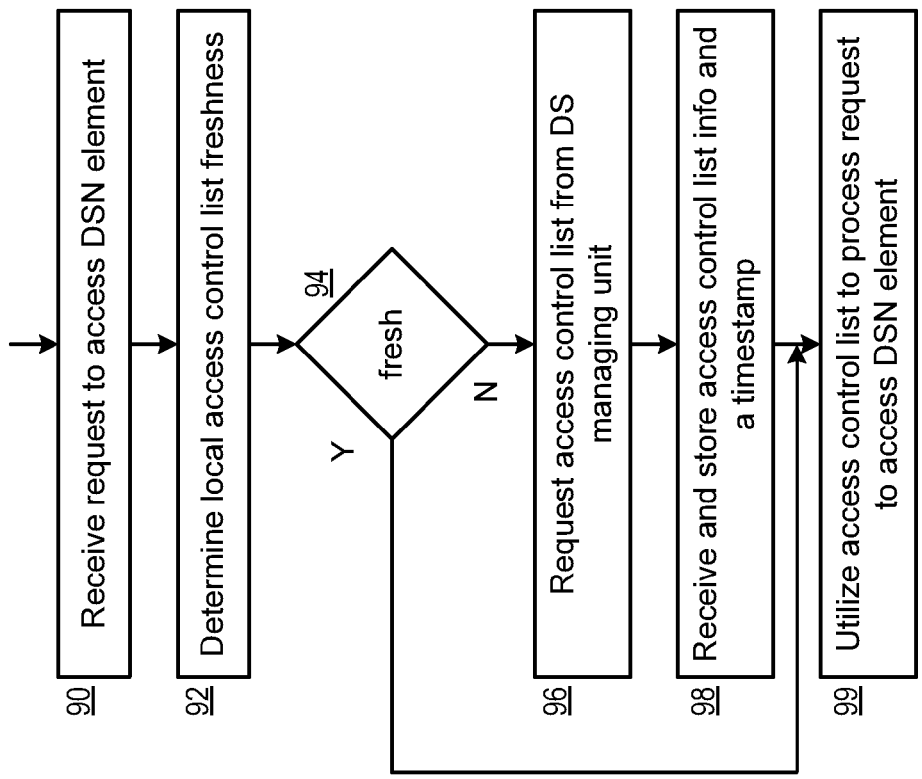
FIG. 6 is a logic diagram of an embodiment of a method for authentication in accordance with the present invention.

FIG. 6 is a flowchart or logic diagram of an embodiment of a method for authentication a transaction or other occurrence in the system of FIG. 1 in accordance where a system element obtains a new access control list (ACL). In a step 90, the system element (e.g. a unit 14, unit 44, unit 16, etc) may receive an access request from a second system element to gain access to at least a portion of the DSN or data therein. The system element may determine the freshness of the locally stored access control list via a step 92. The determination in a step 94 of FIG. 6 may be based on comparing the date and time at which the ACL was last stored to the current date and time, or verifying checksums, signature IDs, valid or dirty bits in the access control list that are indexed like tag bits in a cache memory structure, etc. In one embodiment, the system element may determine that the ACL is fresh when the comparison is less than a threshold amount of elapsed time between the last stored ACL and the current time, and process the request per the step 99 in FIG. 6. The system element may process the access request from the second system element utilizing the current ACL when the ACL is fresh via step 99.

The system element may request the ACL from a third system element (e.g., the DS managing unit 18 of FIGS. 4-5) by sending a permission list request when the current ACL is not fresh, per a step 96 of FIG. 6. The permission list request may be based on the system element private key, and the signed certificate from the certificate authority. The third system element (e.g., the DS managing unit 18) may send an ACL request response in the form of an ACL publish to the system element. The system element may receive the ACL publish and store the ACL locally along with a timestamp of the current data and time, via the step 98 of FIG. 6. In other words, the system may refresh ACL data to some or all of the interested system elements on a request to do so or a time-out or "data dirty or old" indication from the system. The system element may process the access request from the second system element utilizing the new current ACL.

Figure 7:
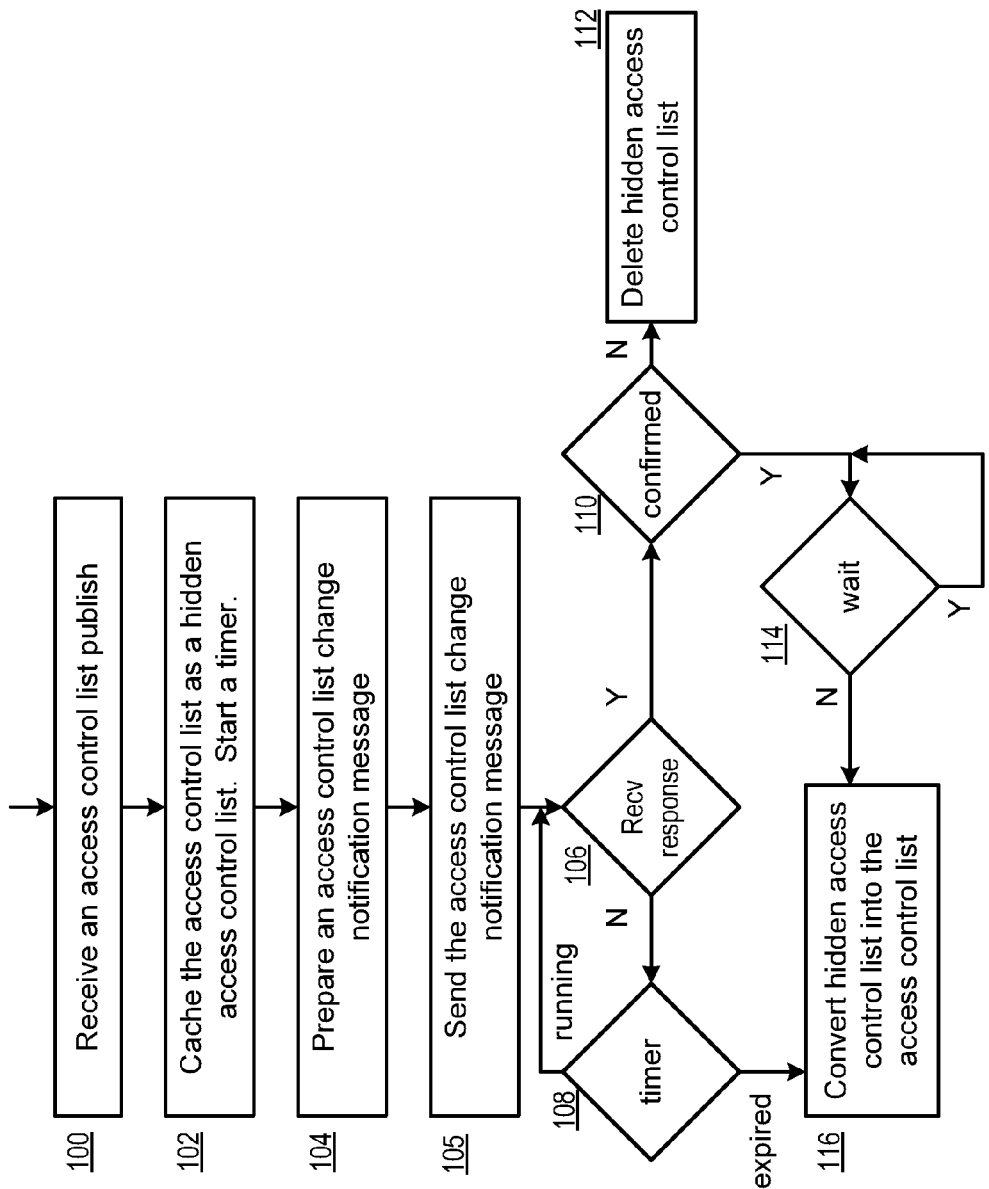
FIG. 7 is a logic diagram of another embodiment of a method for authentication in accordance with the present invention.

FIG. 7 is a flowchart or logic diagram of another embodiment of a method for authentication where a system element verifies the integrity of a new access control list (ACL) publish. In a step 100, the system element within FIG. 1 (e.g., unit 14, unit 44, etc) may receive the ACL publish from the DS managing unit 18 upon boot up, in response to a transaction request or other request, once every so often, on an interrupt event, on a security audit, or from time to time. The system element that receives the ACL may cache or locally store the received ACL along with a timestamp and start a wait period timer, in a step 102 of FIG. 7.

The system element may prepare an ACL change notification message that may include the system element identity and the timestamp, in a step 104. The system element may send the ACL change notification message to other system elements (e.g., one or more of the user device 10, the DS processing unit 14, the dispersed storage integrity processing unit 16, the DS managing unit 18, and the DS storage unit 44), via a step 105. The system element may determine if it has received a response to the ACL change notification message during the timeframe of the wait period timer, per steps 106 and 108 of FIG. 7. The system element may convert the cached received ACL into the current ACL when no responses are received and the wait period timer has expired, in a step 116.

The system element may determine if a received response confirms the ACL publish when the response is received before the wait period timer has expired, in a step 110. The system element may delete the cached received ACL when the response does not confirm the ACL publish, in a step 112. Step 112 may be executed in the case where no other system can verify that the ACL change request is valid or been pervasively issued to other system elements in the system. If only one system element received a ACL change event for data or memory locations for a user or set of data, and no other systems associated with that user or data received similar request, then the data is likely to be a security breach or other event, and the ACL change should not be allowed. As another example, the DS managing unit 18 may send a "not confirmed" response when it determines that it did not source the ACL publish and hence the received ACL publish may be invalid, an error, a security breach (e.g., a system attack), etc. Therefore, the only way to have a chance to security breach the system is to find and identify all the system elements associated with the user or data and issue simultaneous ACL change requests to all of them in a manner that appears to the system as valid. Such a security breach will be very difficult in this secure and dispersed data storage system.

The system element may wait for the wait period timer to expire to convert the cached received ACL into the current ACL when the response confirms the ACL publish, in a step 114. In another embodiment, the system element may not wait for the wait period timer to expire to convert the cached received ACL into the current ACL when the response confirms the ACL publish, whereby step 114 may not be present in other embodiments. In another embodiment, the system element may gather more than one confirmed responses or do a weighted average of a plurality of responses, or wait for a set number of valid authentication responses before converting the cached received ACL into the current ACL when the responses confirm the ACL publish. Therefore, the wait period in step 114 may differ in different embodiments or for different users, data types, or system security settings.

Figure 8:
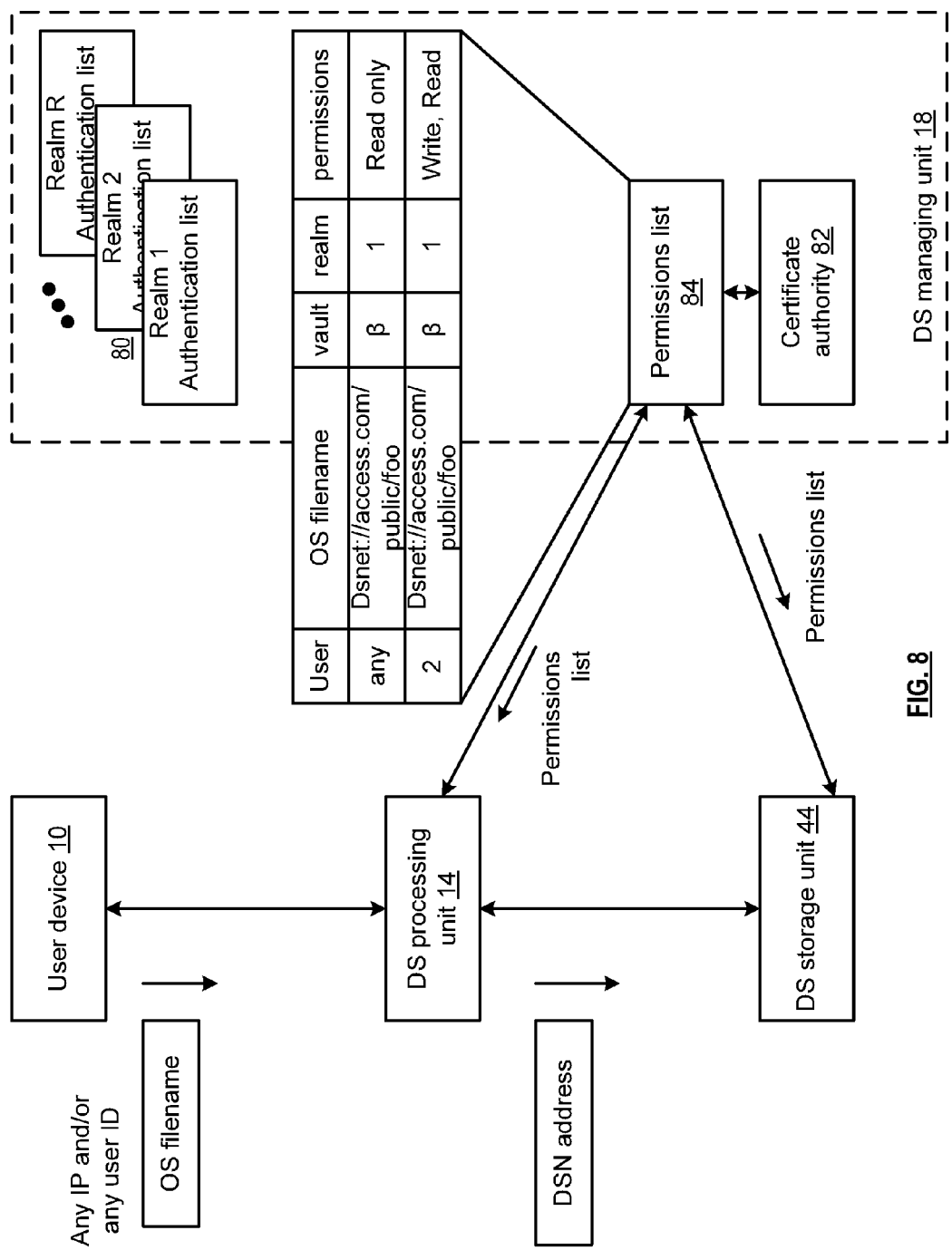
FIG. 8 is a schematic block diagram showing another embodiment of an authentication system in accordance with the invention.

FIG. 8 is a schematic block diagram of another embodiment of an authentication system that includes the user device 10, the DS processing unit 14, at least one DS storage unit 44, and the DS managing unit 18. The DS processing unit 14 and the DS storage unit 44 may utilize the permissions list 84 to grant access to open portions of the DSN memory spread over the network 20. In other words, the system may create or have open access data/storage/information where anyone is allowed access to this data and memory area. In another scenario, select users may have permissions to write into those open portions of the DSN memory, but in some embodiments may not be able to read data from those portions.

The DS managing unit 18 may include the permissions list 84, the certificate authority (CA) 82, and one or more authentications lists 80 which may be organized as realm 1 authentication list through realm R authentication list as shown in FIG. 8. The authentication lists 80 may be utilized to control which users have the authority to read and/or write to the open portions of the DSN memory. The permissions list 84, certificate authority 82, and authentication lists 80 may be part of one or more DS managing units 18, DS processing units 14, DS storage units 44, user devices 10 or 12, and/or storage integrity processing units 16 of FIG. 1.

The permissions list 84 may be an access control list (ACL) which may contain a list of functions and data entries organized by user ID, OS filename, UUID, DSN memory addresses to signify which users which permissions assigned to them. Note that the user ID field may include a wildcard such that any user ID may be allowed to perform certain access functions (e.g., read only). The DS managing unit 18 of FIG. 8 may index into the list 84 by the user ID, the OS filename, and/or the UUID discussed herein. The realm 80 may specify different portions of the DSN (e.g., different DSN providers or user groups) and may utilize a different authentication list for each realm. The DS managing unit 18 may receive a request to access the permissions list 84 to verify that the user, the system element acting on behalf of a user, or the system element has the right permissions level to perform a requested function. The permissions list 84 may indicate which realm a particular user belongs to. The DS managing unit 18 may respond to the request based on the permissions list contents.

In an example of operation, the user device 10 may send a read file request to the DS processing unit 14 where the request minimally includes the OS filename (e.g., Dsnet:// access.com/public/foo). The DS processing unit 14 may utilize its locally stored copy of the permissions list 84 to determine if the request should be executed according to applicable permissions and/or security modes. The DS processing unit 14 may request a new copy of the permissions list 84 from the DS managing unit 18 as described earlier. Such a request may be made when the unit 14 does not have a fresh locally stored permissions list, or this list is not presently accessible for some reason.

The DS processing unit 14 may determine that the read file request is allowed when the permissions list indicates that filename is available for reading by any user. The DS processing unit 14 may determine that a write request is allowed when user 2 is requesting that operation and the permissions list 84 indicates that filename is available for writing by user 2. The DS processing unit 14 may also authenticate user 2 in accordance with the authentication list 80 for user 2 as described earlier.

The DS processing unit 14 may determine the DSN address for the file based on the OS filename as described earlier and send an EC data slice request to at least some of the DS storage units 44 that contains EC data slices for the file that is being requested. The request may include the DSN address and no specific user ID information since it is an open access request. The DS storage unit 44 may receive the EC data slice request containing the DSN address.

The DS storage unit 44 may utilize its locally stored copy of the permissions list 84 to determine if the request should be executed. The DS storage unit 44 may request a new copy of the permissions list 84 from the DS managing unit 15 as described earlier when it does not have a fresh locally stored permissions list, is unable to access the locally cached/stored permission list data, etc.

The DS storage unit 44 may determine that the read file request is allowed when the permissions list 84 indicates that the filename is available for reading by any user. The DS storage unit 44 may determine that a write request is allowed when user 2 is requesting and the permissions list indicates that filename is available for writing by user 2. The DS storage unit 44 may also authenticate user 2 in accordance with the authentication list for user 2 as described earlier.

The DS storage unit 44 may retrieve EC data slice for the DSN address of the requested data file based on a local virtual DSN address and by performing an address location table lookup when the permissions list check is favorable. The DS storage unit 44 may send an error message to one or more system elements (e.g., the user device 10 or 12 and DS managing unit 18) when the permission list check is unfavorable. The DS storage unit 44 may send the EC data slice for the requested file to the DS processing unit 14 where the DS processing unit 14 may re-construct the file and send it to the user device when the data request is authorized or valid.

Figure 9:
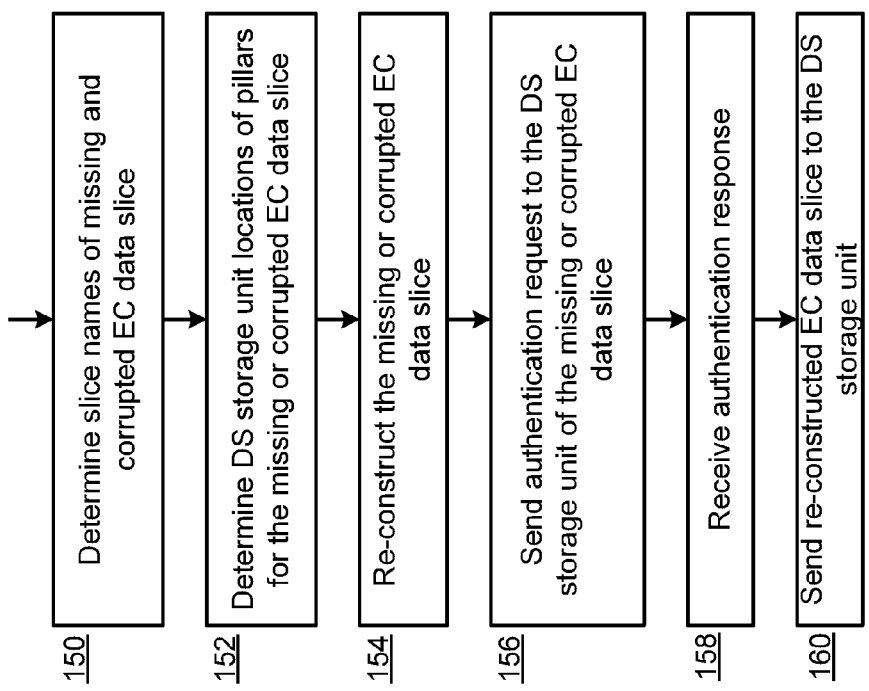
FIG. 9 is a logic diagram of another embodiment of a method for authentication in accordance with the present invention.

FIG. 9 is a logic diagram of another embodiment of a method for authentication where the storage integrity processing unit 16 of FIG. 1 will authenticate operations before rebuilding a portion of the DSN memory out across the network 20. The method may be executed by any one or more of the storage integrity processing unit or units 16, the DS processing unit 14, the DS storage unit(s) 44, and/or the DS managing unit 18.

In a step 150 of FIG. 9, the storage integrity processing unit 16 may determine the error slice name of a corrupted or missing EC data slice by any one or more of receiving a message from a scanning agent, comparing slice name lists from two or more DS storage units 44 that store data for the same vault (e.g., the lists should be the same), an individual slice integrity check (e.g., based on a CRC check), and/or other processes.

The storage integrity processing unit 16 may determine the DS storage unit locations for the error slice name based on the virtual DSN memory-to-physical-location table in a step 152. The storage integrity processing unit 16 may also retrieve the good EC data slices corresponding to the error slice name and reconstruct the error slice as a good slice from the other good EC data slices via a step 154.

The storage integrity processing unit 16 may then send a store EC data slice request to the DS storage unit that is responsible for the error slice, via a step 156. The request may include the identity of the storage integrity processing unit 16, the good slice to be newly stored to replace the error slice, the slice name of the error slice, and the certificate based on the storage integrity processing unit's private key and the signed certificate from the certificate authority 82 of FIG. 8.

The DS storage unit 44 may receive the store request from the storage integrity processing unit 16. The DS storage unit 44 may have the permissions list 84 from FIG. 8 stored/cached locally. The DS storage unit 44 may request the permissions list 84 of FIG. 8 from another system element (e.g., the DS managing unit) by sending a permission list request when it does not have the permissions list 84 or if the permissions list is outdated (e.g., older than a threshold amount of time). The permission list request may be based on the DS storage unit private key, and the signed certificate from the certificate authority. The DS storage unit may receive the permissions list and store it locally.

The DS storage unit may send a store request response to the storage integrity processing unit 16. The response may be favorable when the DS storage unit 44 verifies that the certificate is valid and that the storage integrity processing unit 16 is authorized to write to at least a portion of the DSN. Note that the storage integrity processing unit 16 must be a trusted system element to gain approval to carry out this system task of rebuilding. If the operation is authenticated, an authentication response is exchanged in a step 158.

The storage integrity processing unit may receive the store request response and send the good slice to the DS storage unit for storage upon validation of the reconstruction operation by the system, in a step 160.

Figure 10:
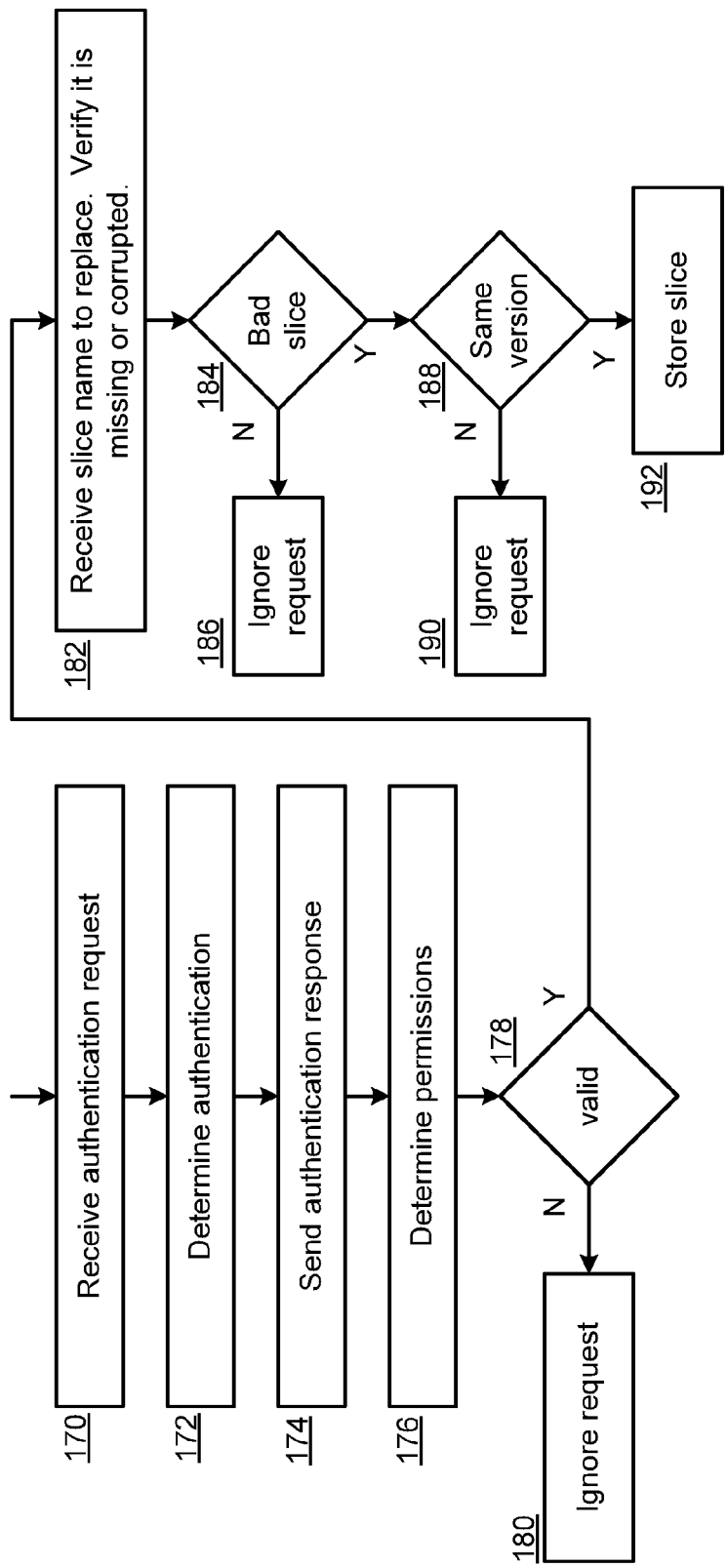
FIG. 10 is a logic diagram of another embodiment of a method for authentication in accordance with the present invention.

FIG. 10 is a logic diagram of another embodiment of a method for authentication where the DS storage unit 44 of FIG. 1 may authenticate a request to store a corrected slice as part of a DSN data rebuilding process. The method may be executed by any one or more of one or more DS storage units 44, the storage integrity processing unit 16, the DS processing unit 14, and/or the DS managing unit 18. In some embodiments, a user device 10 or 12 may initiate a data rebuilding operation, especially if a user suspects that data may be in danger of being compromised or lost through certain system failures of which they are aware.

The DS storage unit 44 may receive an authentication request from a requester to store a rebuilt slice (e.g., from the storage integrity processing unit 16 of FIG. 1), via s step 170 of FIG. 10. The DS storage unit 44 may determine the authentication of the requester by checking the permissions list, in a step 172. The DS storage unit 44 may have the permissions list 84 of FIG. 8 stored locally. The DS storage unit 44 may request the permissions list 84 from another system element (e.g., the DS managing unit 18) by sending a permission list request when it does not have the permissions list 84 or if the permissions list is outdated (e.g., older than a threshold amount of time) or inaccessible at this time. The permission list request may be based on the DS storage unit private key, and the signed certificate from the certificate authority 82 of FIG. 8. The DS storage unit 44 may receive the permissions list 84 and store it locally. Once authorized, authentication responses are communicated with the system of FIG. 1 in a step 174, and permissions are accessed and checked as discussed above in the steps 176 and 178. If authentication fails or is unfavorable, the request is ignored in a step 180, and/or various reporting or security actions can be requested or logged.

The DS storage unit 44 may send a store request response to the requester when the authentication is favorable via a step 182. The response may be favorable when the DS storage unit 44 verifies that the certificate is valid and that the requester is authorized to store to at least a portion of the DSN in steps 176 and 178. Note that the requester must be a trusted system element to gain approval to carry out this system task of rebuilding.

The now-authenticated requester may receive the store request response and send the rebuilt slice (and slice name) to the DS storage unit 44 for storage, also within the step 182.

The DS storage unit 44 may verify that the authenticated requester also has the proper permissions to store data to this particular DSN address. In an example, authenticated DS storage unit 44 (e.g., the requester) may have permissions to write to the DS storage unit since it is one of a set of DS storage units 44 that serve the same DSN address range (e.g., same vault). In another example, an authenticated DS storage unit within the system may not have permissions to write to the destination DS storage unit since the authenticated unit is not one of a set of DS storage units that serve the same DSN address range as the destination DS storage unit (e.g., same vault).

The DS storage unit 44 may receive the slice name and the rebuilt slice that is to replace a defective slice in the step 182. The DS storage unit 44 may verify that the currently stored slice is in error (e.g., missing or corrupted). The verification may be based on one or more of comparing a new calculated CRC32 to the previously stored CRC32 for the stored EC data slice, and/or determining if the slice name exists in a step 184. The DS storage unit 44 may verify the current slice is in error if either the CRC's don't match or if the slice name is missing, again, in the step 184.

The DS storage unit 44 may ignore the store request and discard the received rebuilt slice if the current slice is not in actually in error. In a step 188, the DS storage unit 44 may verify that the version number is the same in the received rebuilt slice and the currently stored slice when the current slice is in error and needs correction or replacement. The DS storage unit 44 may store the received rebuilt slice as the new current slice when the version numbers are the same in the step 192, or may ignore the request and take corrective action if the version numbers do not match for some reason in a step 190. Note that this last step 192 restricts the storing process to rebuilt data and excludes storing new data to help bolster the computing system integrity.

Figure 11:
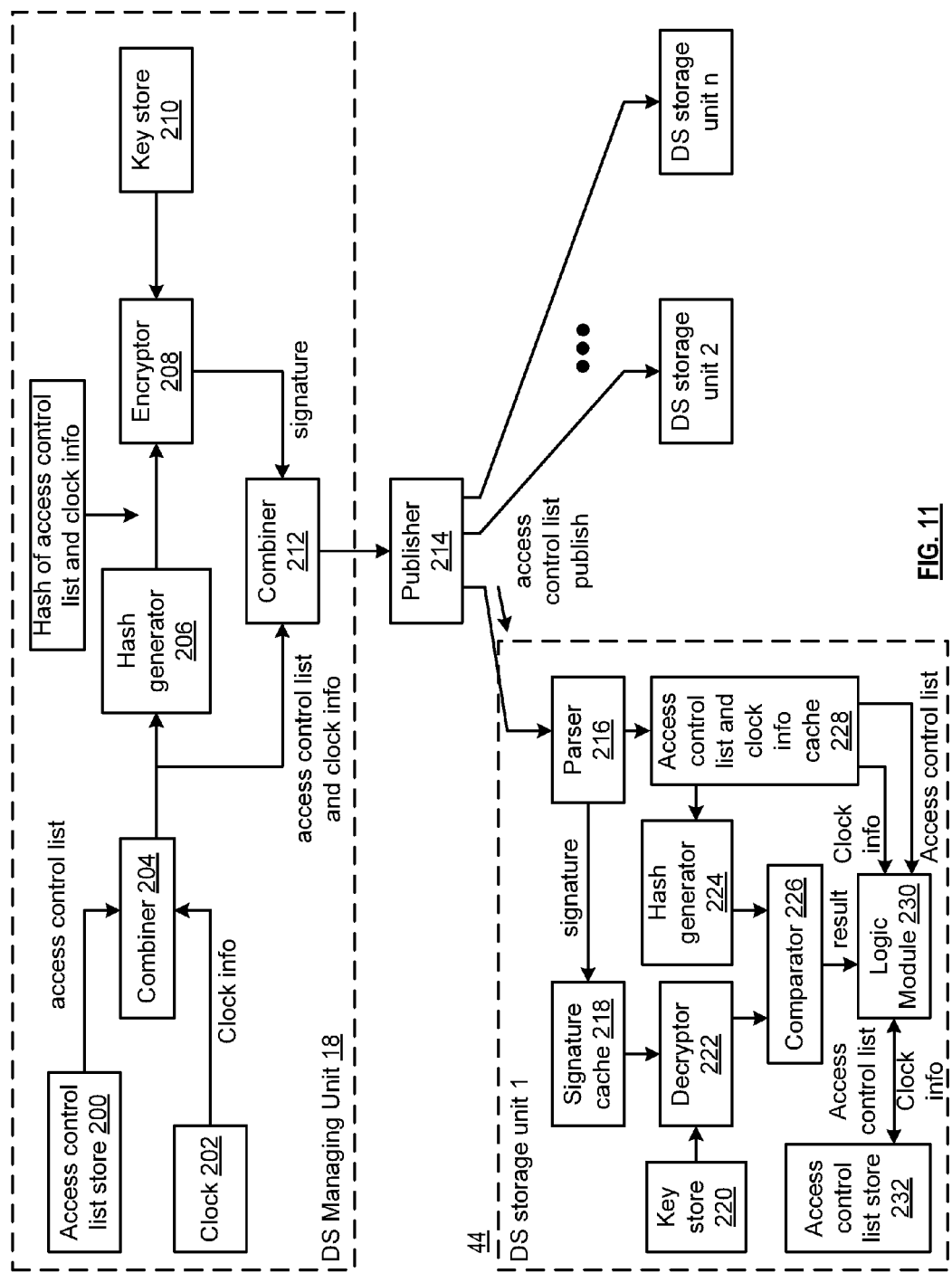
FIG. 11 is a schematic block diagram showing another embodiment of an authentication system in accordance with the invention.

FIG. 11 is a schematic block diagram of another embodiment of an authentication system that includes a DS managing unit 18, a publisher 214, and n DS storage units 1 through n, where n is any positive integer. The publisher 214 may push the access control list to the DS storage units 44 on behalf of the DS managing unit 18 with a reduced level of security breach or external attack vulnerability to the DS managing unit 18.

The DS managing unit 18 may include an access control list store 200, a clock 202, combiners 204 and 212, a hash generator 206, an encryptor 208, and a key store 210. The access list store 200 may be a memory that stores the access control list and the clock may provide clock information, including real time date and/or time. The combiner 204 may create a single combined object containing access control list data and clock information. The hash generator 206 may create a CRC32 hash or some other hash of the combined access control list and clock information provided by the combiner 204. The key store 210 may be a memory that stores a key. The key may be a private key that may be unique to the DS managing unit 18. In some embodiments, one may not trust a CRC-32 digital signature scheme as a CRC-32 scheme can sometimes be easy to manipulate. Sometimes, CRC-32 can be processed to detect collisions so an attacker could manipulate the message such that the message still had the same CRC-32 value and it would be accepted as valid, yet contained improper data. Therefore, the processes taught herein may work with more robust digital signature techniques other than those that work by encrypting a hash with a private key. The encryptor 208 may encrypt the combined access control list and clock information from combiner 204 and generator 206 utilizing the key from store 210 and an encryption algorithm that may be specified by the security parameters of the system. The encryptor produces a signature as an output. The combiner 212 may create an access control list publish object containing the access control list store info, clock information, and signature info. The access control list publish object may be communicated external to the unit 18 to the publisher 214 shown in FIG. 11.

The DS managing unit 18 may send the access control list publish to the publisher when performing access control list data updating across many different system resources or system elements in FIG. 1. Note that the publisher 214 is not part of the DS managing unit 18 and may be external to the DSN system elements such that the publisher is outside of any DSN security firewalls that are between the network 20 (see FIG. 1) and the DSN system elements. This isolation of the publisher 214 is especially useful when the network 20 comprises in whole or in part the non-secure public internet. Further note that the publisher 214 does not have any encryption key information which may lower the potential undesired impact from security attacks directed to the publisher 214.

The publisher 214 may send the access control list publish to the DS storage unit 44 upon request by the DS storage unit 44, upon boot up, and/or from time to time. The publisher 214 may send the access control list publish to the DS storage units 44 one at a time or as a batch. The publisher 214 may send the access control list publish batches by vault, by groups of vaults, by DS storage unit sites, and/or by a list.

The DS storage unit 1 in FIG. 11, shown as unit 44, may include a parser 216, an access control list and clock info cache 228, the hash generator 224, a signature cache 218, a key store 220, a decryptor 222, a comparator 226, a logic module 230, and an access control list store 232. The parser 216 may receive the access control list publish from the publisher 214 of FIG. 11 and may parse the access control list publish into the signature (send to the signature cache 218) and the access control list and clock information (sent to the cache 228). The parser 216 may save the signature in the signature cache 218 and the access control list and clock information in the access control list and clock information cache 228 via any one or more of a number of cache storage algorithms and structures.

The hash generator 224 may retrieve the access control list and clock information from the access control list and clock information cache 228 and calculate a hash of the access control list and clock information. The hash operation may be a CRC32 hash process.

The key store 220 may be a memory that stores a key. The key may be a public key that may be paired with a private key of the DS managing unit 44. The decryptor 222 may retrieve the signature from the signature cache 218 and decrypt the signature utilizing the key and an encryption algorithm that may be specified by the security parameters to produce the signature.

The comparator 226 may compare the signature output from decryptor 222 to the hash of the access control list and clock information from the hash generator 224 to produce a result. The resulting output (the result) from comparator 226 is an indication that either the decryptor output and the hash generator output are the same or they are not the same.

The logic module 230 may retrieve the clock information and access control list from the access control list and clock information cache 228, receive the result from the comparator 226, and obtain the clock information from the access control list store 232. Note that the clock information from the access control list store may be a timestamp of the time at which the current access control list was stored in the access control list store 232. In another embodiment, the clock information could be the clock info extracted from a previously-stored access control list, whereby if there is no previously-stored access control list, then this step could be skipped.

The logic module 230 may send the access control list from the access control list and clock information cache 228 to the access control list store 232 as a new access control list when the result indicates a matched or correlated output units 222 and 224 (e.g., the decrypted signature matched the hash of the received access control list and clock information) and the clock information from the access control list and clock information cache 228 is newer (e.g., more recent) than the clock information from the access control list store 232 (e.g., the last timestamp).

The logic module may send an error message to at least one other system element and may delete the access control list from the access control list and clock information cache 228 when either the result did not indicate a proper correlation or match (e.g., the decrypted signature did not match the hash of the received access control list and clock information) or the clock information from the access control list and clock information cache 228 is not newer (e.g., it's older) than the clock information from the access control list store 232 (e.g., the last timestamp).

In another embodiment, the clock information provided via clock 202 may not be checked by the clock processing shown in the storage unit 44, but rather checked against the clock info from the previously stored/known signed-permission-list associated with the unit 44. This can be performed to ensure that an attacker is not providing an obsolete or old signed permission list (which may be viewed as valid) but may indicate different permissions that suite the attacker.

In another embodiment, the information provided by the clock 202 does not have to be clock or timestamp info at all. Rather, this information could be an always increasing sequence number or some other number scheme not associated directly with passage of time. The only added difficulty with this approach is that the DS managing unit 18 would have to durably maintain the last published sequence number that it used, whereas using a unique clock time doesn't require the keeping this information. The receiving units within the systems taught in FIGS. 1-11 always verify that the timestamp or sequence number of the newly received permission list is greater than that of the previous one.

Without this increasing check on a time stamp or sequence number, the system could be exploited in some systems. Imagine a user A was once an employee at Company A and once had permission to a vault, but recently left Company A and his permission to the vault was removed. If user A could send fake network traffic to an appliance where this traffic providing an old signed permission list, the appliance would think it is valid, since it has a correct signature. Without the time stamp or sequence check, the user A could roll permissions backward in time and could restore old permissions to user A, which is not desirable. The timestamp/sequence number check procedure prevents this for being possible, because DS units of FIGS. 1-11 will only accept as valid updates a set of permission with a sequence number of time stamp that show that is was generated after the last instantiation of permissions (i.e., only newer permissions can replace older permission, not the other way around). This ensures that even if a publisher 214 was compromised by an attacker, the attacker couldn't do anything but withhold further updates, which could of course be detected and remedied.

Figure 12:
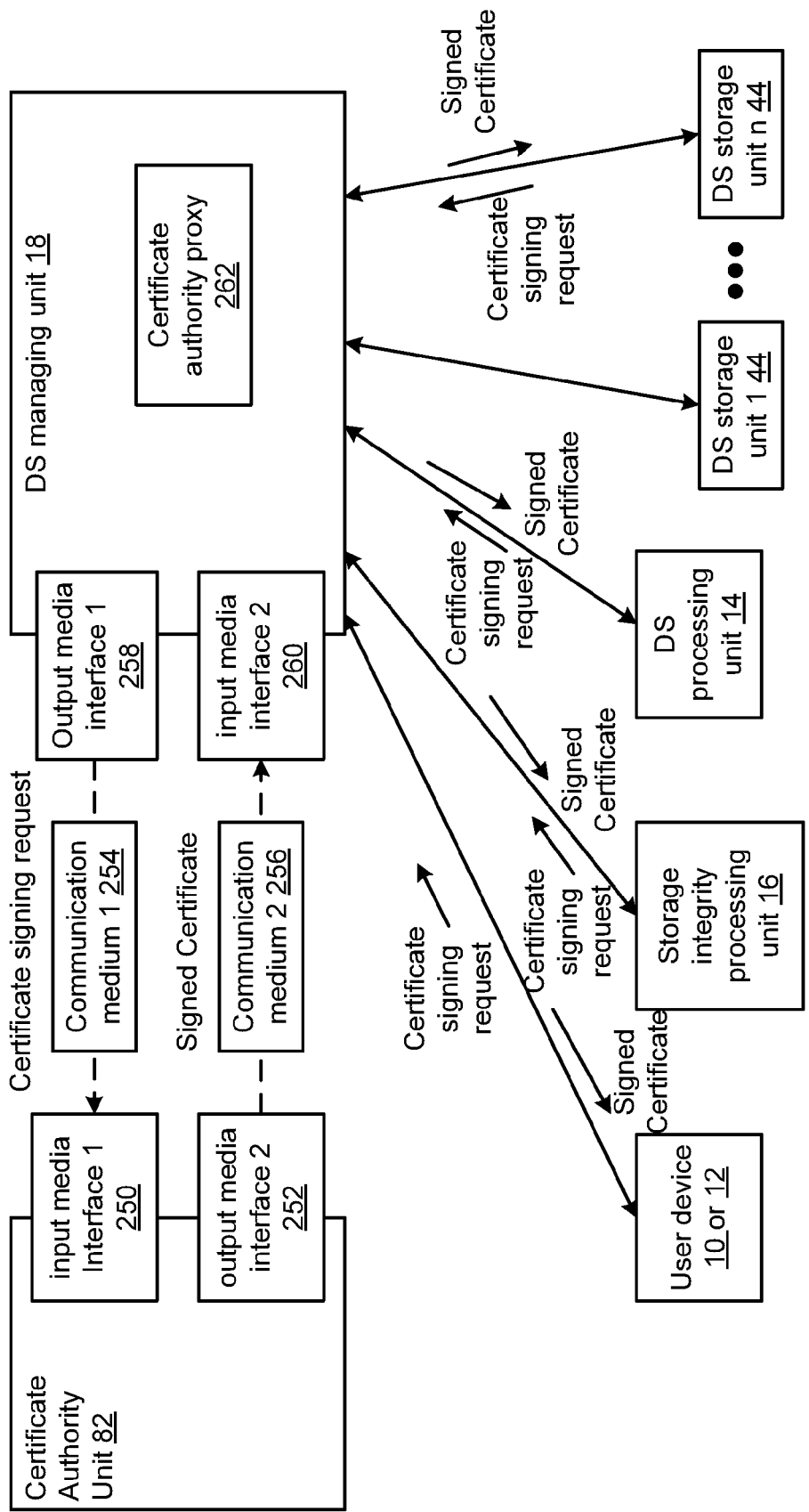
FIG. 12 is a schematic block diagram showing another embodiment of an authentication system in accordance with the invention.

FIG. 12 is a schematic block diagram of another embodiment of an authentication system that includes a certificate authority unit 82, a communication medium 1 254, a communication medium 2 256, a DS managing unit 18, the user device 10 or 12, the storage integrity processing unit 16, the DS processing unit 14, the plurality of DS storage units 44, indexed as units 1 through n in FIG. 12.

The certificate authority unit 82 and DS managing unit 18 may be a portable device or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, a video game console, and/or any type of home or office computing equipment.

The certificate authority unit 82 and DS managing unit 18 may be a stand-alone portable device or a fixed device or may be a functional module within another unit that is itself a portable device or a fixed device. For example, the DS managing unit 18 may be a computer server and the certificate authority unit 82 may be a functional module operating on the same computer server as the DS managing unit 18. In another example, the certificate authority unit 82 may be a functional module operating on the same smart phone as one of the DS storage units 44. In another embodiment, a unit of FIG. 12 may be software executing on the hardware that defines another unit in FIG. 12.

The certificate authority unit 82 may include an input media interface 1 250 and an output media interface 2 252 as shown in FIG. 12. The input media interface 1 250 and the output media interface 2 252 may be implemented in part within the certificate authority unit 82 or externally to the certificate authority unit 82. The certificate authority unit 82 may utilize the input media interface 1 250 to only receive an incoming certificate signing request and the output media interface 2 252 to only send an outgoing signed certificate to facilitate improved security. The certificate authority unit 82 may respond to receiving the certificate signing request by issuing a signed certificate that the system element (e.g., user device 10 or 12, storage integrity processing unit 16, DS processing unit 14, and/or the DS storage unit 44) may utilize in combination with its private key to access other system elements of FIG. 12. The certificate authority unit 82 may issue a signed certificate when the certificate signing request is in order (e.g., the user identity and public key match the local records and no other potentially malicious information is contained in the certificate signing request).

The DS managing unit 18 may include a certificate authority proxy 262, an input media interface 2 260 and an output media interface 1 258. The input media interface 2 260 and the output media interface 1 258 may be implemented in part within the DS managing unit 18 or externally to the DS managing unit 18. The DS managing unit 18 may utilize the input media interface 2 260 to only receive the signed certificate and the output media interface 1 258 to only send the certificate signing request to facilitate improved security.

The certificate authority unit 82 may be operably coupled to the DS managing unit 18 via the communication medium 1 254 and communication medium 2 256. The communication medium 1 254 and communication medium 2 256 may comprise a non-real time information transfer technology including one or more of a NAND flash drive, an optical disk, a magnetic disk. Meaning, that the mediums 254 and 256 may involve human or mechanical transfer of a storage medium device from one system to another to facilitate continued communication of data. The communication medium 1 254 and communication medium 2 256 may comprise a real time information transfer technology including one or more of a wired connection (e.g., universal serial bus, Ethernet, local area network) or a wireless connection (e.g., wireless local area network, point-to-point wireless, infrared, optical). The communication medium 1 254 and communication medium 2 256 may utilize the same or different information transfer technology.

The certificate authority proxy 262 may receive the certificate signing request from the system element (e.g., user device 10 or 12, storage integrity processing unit 16, DS processing unit 14, the DS storage unit 44) and may cache the certificate signing request locally in associated with the unit 18. The certificate authority proxy 262 may send the certificate signing request to the certificate authority unit 82 via the output media interface 1 158. The certificate authority proxy 262 may send an alert to one or more of the DS managing unit 18, the user device 10 or 12, the DS processing unit 14, the storage integrity processing unit 16, and/or the DS storage unit(s) 44 to flag the new certificate signing request. The certificate authority proxy 262 may receive the signed certificate from the certificate authority unit 82 via the input media interface 2 260 and may match it to the cached certificate signing request. The certificate authority proxy 262 may send the signed certificate to the involved system element when signed certificate matched the cached certificate signing request.

In an example of operation, the DS processing unit 14 sends the certificate signing request to the DS managing unit 18. The certificate authority proxy 262 receives the certificate signing request, caches it, generates the alert and sends the certificate signing request to the certificate authority unit 82 via the output media interface 1 258 over the communication medium 1 254 and the input media interface 1 250. In an embodiment, the communication medium 1 254 is the NAND flash memory.

The certificate authority unit 82 processes the certificate signing request to verify that it is in order. The certificate authority unit 82 may generate and send the signed certificate to the certificate authority proxy 262 via the output media interface 1 252 over the communication medium 2 256 and the input media interface 2 260 when the certificate signing request is in order. In an embodiment, the communication medium 2 256 is a one-way point-to-point wireless link.

The certificate authority proxy 262 may receive and match the signed certificate to the cached certificate signing request. The certificate authority proxy 262 may send the signed certificate to the DS managing unit 18 to complete the process.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item(s) (e.g., an item includes, but is not limited to, a component, an element, a circuit, and/or a module) where, for indirect coupling, the intervening item(s) do not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may further be used herein, the term "operable to" indicates that an item includes one or more of power connections, input(s), output(s), etc., to perform one or more its corresponding functions once operating and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be used or defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The various hardware and/or software units shown herein (e.g., units 10, 12, 14, 16, 18, 44, etc.) may contain custom hardware or software that performs specific functions taught in the Figures or may each contain one or more computing cores similar to that shown in FIG. 2 for processing one or more of the functions shown within the unit. Furthermore, the Figures and specification herein describe a digital signature as being calculated as the encryption of a hash value. This is one way that the digital signature algorithms herein can work, but it is not the only way. This is the way RSA signatures may be implemented, but the process is different for DSAs (Digital Signature Algorithms), and these other algorithms may also be used with the embodiments taught herein. Therefore, signatures as taught may be created by one or more of any application of a digital signature algorithm (RSA signature, DSA, ElGamal signature, Elliptic Curve DSA, or any other digital signature technique) rather than a hash encrypted approach that uses a private key or other key. In DSA, for example, while there is a private key for signing and a public key for verifying, DSA private keys may not be encrypted.

In addition, a distribution of permissions or access control info could occur at multiple levels in a hierarchy of multiple memory devices or locations. It is not always the case that one machine is sent an access control change notification and that machine has to do everything. Rather, the system could be hierarchically organized much like a phone tree, where one DS unit is told initially about the distribution, and that one unit tells one or more other units, and each of those in turn tells even more units, etc., until the entire DS system is updated. This tree structure might be organized in advance, or may be organized through some dynamic algorithm whereby the structure may change over time.

What is claimed is:

1. A method comprises:
receiving, by each dispersed storage (DS) of a set of DS units of a distributed computing system, a corresponding one of a set of access requests regarding a set of error coded data slices, wherein a data segment is encoded using an error coding algorithm to produce the set of error coded data slices, wherein each DS unit of the set of DS units stores a corresponding error coded data slice of the set of error coded data slices, wherein the corresponding one of the set of access requests is regarding the corresponding error coded data slice of the set of error coded data slices;
determining, via a computing core of each DS unit of the set of DS units, whether a local access control list is fresh with respect to the corresponding encoded data slices of the set of encoded data slices, wherein the local access control list includes access permissions;
when, for one of the set of DS units, the local access control list is not fresh with respect to a corresponding one or more of the encoded data slices:
requesting, by the one of the set of DS units, a fresh access control list from a DS managing unit, wherein the DS managing unit maintains an access control list for the distributed computing system;
storing, by the one of the set of DS units, the fresh access control list as the local access control list;
verifying, by each of the DS units in the set of DS units, the corresponding one of the set of access requests in accordance with the access permissions of corresponding local access control lists; and
executing, by the computing core of each of the DS units in the set of DS units, the corresponding one of the set of access requests regarding the corresponding error coded data slice when the corresponding one of the set of access requests are verified.

2. The method of claim 1 wherein an access request of the set of access requests comprises one of:
a dispersed data write operation that instructs the DS unit to store the error coded data slice; and
a dispersed data read operation that instructs the DS unit to read and output the error coded data slice.

3. The method of claim 1 wherein the verifying the corresponding one of the set of access requests comprises:

sending, by the one of the set of DS units, an update notification to other DS units of the set of DS units regarding the fresh access control list;

utilizing, by the one of the set of DS units, responses from at least some of the other DS units of the set of units to verify the fresh access control list; and utilizing, by one or more of the other DS units, the update notification regarding the fresh access control list to verify that a local DS unit access control list is correspondingly fresh.

4. The method of claim 1, wherein the determining whether the local access control list is fresh comprises at least one of:

when a passage of time exceeds a threshold time since a last storage of the local access control list;

verifying a checksum corresponding to the local access control list;

verifying signatures; and detecting setting of one or more dirty bits of the local access control list.

5. The method of claim 1 wherein the access permissions comprises:

a plurality of permissions in a permission list that indicates which valid users can perform which valid operations within a dispersed storage network.

6. The method of claim 1 wherein the requesting the fresh access control list comprises:

sending a permissions list request based on at least one of a signed certificate from a certificate authority and private key of the one of the set of DS units.

7. The method of claim 1 wherein the set of DS units comprises:

at least a read threshold number of DS units.

8. A dispersed storage (DS) unit of a set of DS units in a distributed computing system, the DS unit comprises:

a network interface;

memory; and a processing module operable to:

receive, via the network interface, a corresponding one of a set of access requests regarding a corresponding one of a set of error coded data slices, wherein a data segment is encoded using an error coding algorithm to produce the set of error coded data slices, wherein each DS unit of the set of DS units stores a corresponding error coded data slice of the set of error coded data slices, wherein the corresponding one of the set of access requests is regarding the corresponding error coded data slice of the set of error coded data slices;

determine whether a local access control list is fresh with respect to the corresponding one of the set of error coded data slices, wherein the local access control list includes access permissions;

when, the local access control list is not fresh with respect to a corresponding one or more of the encoded data slices:

request a fresh access control list from a DS managing unit, wherein the DS managing unit maintains an access control list for the distributed computing system;

store the fresh access control list as the local access control list;

verify the corresponding one of the set of access requests in accordance with the access permissions of the local access control lists; and execute the corresponding one of the set of access requests regarding the corresponding error coded data slice when the corresponding one of the set of access requests is verified.

9. The DS unit of claim 8, wherein the corresponding one of the set of access requests comprises one of:

a dispersed data write operation that instructs the DS unit to store the corresponding one of the set of error coded data slices.

10. The DS unit of claim 8, wherein the processing module is further operable to verify the corresponding one of the set of access requests by:

sending, via the network interface, an update notification to other DS units of the set of DS units regarding the fresh access control list; and utilizing responses from at least some of the other DS units of the set of units to verify the fresh access control list.

11. The DS unit of claim 8, wherein the processing module is further operable to determining whether the local access control list is fresh comprises at least one of:

when a passage of time exceeds a threshold time since a last storage of the local access control list;

verifying a checksum corresponding to the local access control list;

verifying signatures; and detecting setting of one or more dirty bits of the local access control list.

12. The DS unit of claim 8, wherein the access permissions comprises:

a plurality of permissions in a permission list that indicates which valid users can perform which valid operations within a dispersed storage network.

13. The DS unit of claim 8, wherein the processing module is further operable to request the fresh access control list by:

sending a permissions list request based on at least one of a signed certificate from a certificate authority and private key of the DS unit.

* * * * *

UNITED STATES PATENT AND TRADEMARK OFFICE
CERTIFICATE OF CORRECTION

PATENT NO. : 8,782,086 B2
APPLICATION NO. : 12/759703
DATED : July 15, 2014
INVENTOR(S) : Jason K. Resch et al.

It is certified that error appears in the above-identified patent and that said Letters Patent is hereby corrected as shown below:

In the Claims
Col. 31, line 5, in claim 3: after "of the set of" insert --DS--
Col. 32, line 30, in claim 10: after "of the set of" insert --DS--

Signed and Sealed this
Sixteenth Day of June, 2015

Michelle K. Lee
*Director of the United States Patent and Trademark Office*